(12) United States Patent
Yalvac et al.

(10) Patent No.: US 9,012,563 B2
(45) Date of Patent: Apr. 21, 2015

(54) SILANE-GRAFTED OLEFIN POLYMERS, COMPOSITIONS AND ARTICLES PREPARED THEREFROM, AND METHODS FOR MAKING THE SAME

(75) Inventors: Selim Yalvac, Pearland, TX (US); Teresa P. Karjala, Lake Jackson, TX (US); Benjamin R. Rozenblat, Belle Mead, NJ (US); Cynthia L. Rickey, Lake Jackson, TX (US); Randall M. Cuntala, Columbia, NJ (US)

(73) Assignee: Dow Global Technologies LLC, Midland, MI (US)

( * ) Notice: Subject to any disclaimer, the term of this patent is extended or adjusted under 35 U.S.C. 154(b) by 1525 days.

(21) Appl. No.: 11/994,559

(22) PCT Filed: Jul. 10, 2006

(86) PCT No.: PCT/US2006/026689
§ 371 (c)(1),
(2), (4) Date: Jan. 3, 2008

(87) PCT Pub. No.: WO2007/008765
PCT Pub. Date: Jan. 18, 2007

(65) Prior Publication Data
US 2008/0167421 A1 Jul. 10, 2008

Related U.S. Application Data

(60) Provisional application No. 60/698,183, filed on Jul. 11, 2005.

(51) Int. Cl.
| | | |
|---|---|---|
| B60C 1/00 | (2006.01) | |
| C09J 151/06 | (2006.01) | |
| C08F 255/02 | (2006.01) | |

(52) U.S. Cl.
CPC .............. C09J 151/06 (2013.01); C08F 255/02 (2013.01)

(58) Field of Classification Search
USPC .......... 524/261, 494, 547, 570; 428/350, 448, 428/500; 525/63
See application file for complete search history.

(56) References Cited

U.S. PATENT DOCUMENTS

| | | |
|---|---|---|
| 3,645,992 A | 2/1972 | Elston |
| 3,660,261 A | 5/1972 | Wright et al. |
| 4,039,560 A | 8/1977 | Tomoshige et al. |
| 4,076,698 A | 2/1978 | Anderson et al. |
| 4,618,654 A | 10/1986 | Schmidtchen et al. |
| 4,806,594 A | 2/1989 | Gross et al. |
| 5,044,438 A | 9/1991 | Young |
| 5,057,475 A | 10/1991 | Canich et al. |
| 5,064,802 A | 11/1991 | Stevens et al. |
| 5,096,867 A | 3/1992 | Canich |
| 5,132,380 A | 7/1992 | Stevens et al. |
| 5,266,627 A | 11/1993 | Meverden et al. |
| 5,272,236 A | 12/1993 | Lai et al. |
| 5,278,272 A | 1/1994 | Lai et al. |
| 5,321,106 A | 6/1994 | LaPointe |
| 5,324,800 A | 6/1994 | Welborn, Jr. et al. |
| 5,374,696 A | 12/1994 | Rosen et al. |
| 5,470,993 A | 11/1995 | Devore et al. |
| 5,498,809 A | 3/1996 | Emert et al. |
| 5,532,394 A | 7/1996 | Rosen et al. |
| 5,556,928 A | 9/1996 | Devore et al. |
| 5,604,033 A * | 2/1997 | Arthurs et al. ................ 428/350 |
| 5,624,878 A | 4/1997 | Devore et al. |
| 5,703,187 A | 12/1997 | Timmers |
| 5,705,565 A | 1/1998 | Hughes et al. |
| 5,723,398 A | 3/1998 | Rosen et al. |
| 5,741,858 A | 4/1998 | Brann et al. |
| 5,750,813 A | 5/1998 | Hess et al. |
| 5,824,718 A | 10/1998 | Penfold et al. |
| 5,911,940 A | 6/1999 | Walton et al. |
| 5,917,100 A | 6/1999 | Bohm et al. |
| 5,994,474 A | 11/1999 | Wey et al. |
| 5,995,474 A | 11/1999 | Shimano et al. |
| 6,034,021 A | 3/2000 | Wilson et al. |
| 6,043,401 A | 3/2000 | Bagheri et al. |
| 6,048,935 A | 4/2000 | Penfold et al. |
| 6,054,544 A | 4/2000 | Finlayson et al. |
| 6,107,530 A | 8/2000 | Hohner et al. |
| 6,118,013 A | 9/2000 | Devore |

(Continued)

FOREIGN PATENT DOCUMENTS

| | | |
|---|---|---|
| EP | 188777 A2 | 7/1986 |
| EP | 0468651 | 1/1992 |

(Continued)

OTHER PUBLICATIONS

J. Branderup, E. Immergut, E. Grulke, eds. "Polymer Handbook," 4th ed., Wiley, New York, 1999, Section II, pp. 1-76.
Rudin, A., Modern Methods of Polymer Characterization, John Wiley & Sons, New York (1991) pp. 103-112.
William and Ward, J. Polym. Sci., Polym. Let., 6,621 (1968)).
Zimm, B.H. and Stockmayer, W.H., J. Chem. Phys.,17,1301)1949).

*Primary Examiner* — Monique Peets

(57) ABSTRACT

The invention relates compositions containing at least one silane-grafted polyolefin, and in particular, to compositions containing at least one silane-grafted ethylene/α-olefin polymer, which has a melt viscosity less than 50,000 cP, and adhesives containing the same. In one embodiment, the at least one silane-grafted ethylene/α-olefin polymer is formed from an ethylene/α-olefin polymer that has a molecular weight distribution from 1 to 3.5. The invention also relates to the preparation of the silane-grafted polymers, by reacting, for example, an ethylene/α-olefin polymer with at least one silane compound and at least one initiator.

26 Claims, 5 Drawing Sheets

(56) References Cited

U.S. PATENT DOCUMENTS

| | | | |
|---|---|---|---|
| 6,124,370 A | 9/2000 | Walton et al. | |
| 6,172,015 B1 | 1/2001 | Emert et al. | |
| 6,235,848 B1 | 5/2001 | Bickert et al. | |
| 6,299,985 B1 | 10/2001 | Zhang et al. | |
| 6,335,410 B1 | 1/2002 | Finlayson et al. | |
| 6,395,791 B1 | 5/2002 | Chaudhary et al. | |
| 6,414,102 B2 | 7/2002 | Chung et al. | |
| 6,583,188 B2 | 6/2003 | Chaudhary et al. | |
| 6,583,222 B1 | 6/2003 | Chaudhary et al. | |
| 6,723,810 B2 | 4/2004 | Finlayson et al. | |
| 2002/0151647 A1* | 10/2002 | Laughner et al. | 525/63 |
| 2005/0043455 A1* | 2/2005 | Hohner | 524/261 |
| 2009/0105407 A1* | 4/2009 | Karjala et al. | 524/547 |

FOREIGN PATENT DOCUMENTS

| | | | |
|---|---|---|---|
| EP | 0514828 | B1 | 11/1992 |
| EP | 0827994 | B1 | 3/1998 |
| EP | 0850138 | B1 | 7/1998 |
| EP | 0940439 | A1 | 9/1999 |
| EP | 0944670 | B1 | 9/1999 |
| WO | WO-90/01503 | | 2/1990 |
| WO | WO-93/00526 | | 1/1993 |
| WO | WO-9400500 | | 1/1994 |
| WO | WO-9500526 | | 1/1995 |
| WO | WO-98/26001 | | 6/1998 |
| WO | WO-98/38245 | | 9/1998 |
| WO | WO-0172855 | A1 | 10/2001 |
| WO | WO-03040201 | A1 | 5/2003 |
| WO | WO-03087178 | A1 | 10/2003 |
| WO | WO-2004031292 | A2 | 4/2004 |
| WO | WO-2004035680 | A1 | 4/2004 |
| WO | WO-2005100501 | | 10/2005 |

* cited by examiner

SILANE-GRAFTED OLEFIN POLYMERS, COMPOSITIONS AND ARTICLES PREPARED THEREFROM, AND METHODS FOR MAKING THE SAME

REFERENCE TO PRIOR APPLICATION

This application is a 35 U.S.C. §371 National Phase Application of International Application No. PCT/US2006/026689, filed on Jul. 10, 2006, which claims the benefit of U.S. Provisional Application No. 60/698,183, filed on Jul. 11, 2005, incorporated herein, in its entirety, by reference.

FIELD OF INVENTION

The subject invention pertains to compositions containing silane-grafted (or "silanated") polyolefin polymers, and in particular, silane-grafted ethylene/α-olefin polymers having a melt viscosity less than 50,000 cP at 350° F., the preparation of useful adhesive formulations, other applications and articles made therefrom, and methods for making the same. The silane-grafted ethylene/α-olefin polymers are preferably formed from ethylene/α-olefin polymers having a molecular weight distribution from 1 to 3.5.

BACKGROUND OF THE INVENTION

There is a need for solvent-free, low viscosity hot melt adhesive (HMA) and pressure sensitive adhesive (PSA) formulations that maintain adhesive strength at high use temperatures (for example, 104° F. (40° C.) and above).

There is also a need for solvent-free, low viscosity adhesive formulations that can be used in a variety of applications, including, but not limited to, case and carton sealing, automotive, graphic arts, nonwovens, panel assembly, high performance tapes, contact hot melt adhesives, paperboard coatings, inks, personal care and cosmetic products, sealants, color and additive concentrates, carpet-tape adhesives, and woodworking adhesives.

Currently, some of the high performance pressure sensitive adhesives (PSA) based on high molecular weight (W) styrene block copolymers (SBCs) can only be produced using solvents. They can not be applied from a hot melt, due to their high viscosity (molecular weight). The trend is to use solvent-free adhesives for both environmental and cost reasons. Also, reactive hot melts based on urethane chemistry are expensive and have safety issues, since they utilize isocyanate chemistry.

U.S. Publication No. 2005/0043455 discloses crystalline polyolefin homopolymer or copolymer waxes, modified free-radically with a silane compound, and having a viscosity, as measured at 170° C., of between 10 and 50,000 mPa·s, and a heat of fusion >10 J/g. The silane compound used for modification includes at least one olefinic double bond and at least one alkoxy radical attached directly to silicon. The polyolefin waxes used for modification are prepared using a metallocene catalyst (see abstract). This reference discloses the use of high levels of free radical initiator, 0.1 to 10 percent by weight, based on the polyolefin wax, relative to the amount of silane employed, 0.1 to 40 percent by weight, based on the polyolefin wax, (for example, see paragraphs [0097], [0098] and [0116]). European Patent EP 0 944 670 B1 discloses a crosslinkable elastomer composition that includes a silane grafted ethylene alpha-olefin interpolymer elastomer with a hardness (Shore A)≤85, and, optionally, a crystalline olefin polymer. Exposure to moisture converts the crosslinkable composition into a nonporous, grafted and crosslinked elastomer composition that has a hardness (Shore A)≤85 and an abrasion resistance that is greater than that of the crosslinkable composition (see abstract). This patent discloses the use of a preferred amount of silane, 0.1 to 3.5 weight percent, and relatively high levels of initiator, with a ratio of silane to initiator from 10:1 to 30:1 (for example, see paragraphs [0026] and [0027]).

International Publication No. WO 2005/100501 discloses an article comprising 1) a functionalized component, 2) tackifier, and 3) an olefin polymer, comprising one or more C3 to C40 olefins, optionally one or more diolefins, and less than 5 mole of ethylene, and having a Dot T-Peel of one Newton or more, a branching index (g') of 0.95 or less, measured at the Mz of the polymer; and an Mw of 100,000 or less. The functional component is selected from the group consisting of functionalized polymers, functionalized oligomers and beta nucleating agents (see abstract). The experimental examples in this reference are mainly directed to maleic anhydride grafted polypropylene base polymers.

U.S. Pat. No. 5,824,718 discloses curable, silane-grafted substantially linear ethylene polymers, which are useful as wire and cable coatings, weatherstripping, fibers. These silane-grafted polymers can be either filled or unfilled, and cure quickly relative to many commercial coatings (see abstract). This patent discloses ethylene/α-olefin base polymers with a preferred melt index (12) from 0.5 to 200 g/10 min (for example, see column 4, lines 7-10). See also related patents, U.S. Pat. No. 5,741,858 and U.S. Pat. No. 6,048,935. U.S. Pat. No. 4,806,594 discloses a water curable composition comprising: (a) at least one polymer selected from the group consisting of silane grafted homopolymers of ethylene, propylene, or 1-butene (see abstract). In the examples of this patent, a relatively high molecular weight polyethylene is silanated (see Examples 1-19).

U.S. Pat. No. 5,995,474 discloses an adhesive composition which comprises a silane-grafted, largely amorphous poly-α-olefin, prepared by grafting onto this amorphous poly-α-olefin a silane compound having from 1-3 alkoxy groups, attached directly to the silicon, and at least one olefinic double bond containing moiety, and then crosslinking the adhesive composition by means of water (see abstract). This patent is mainly directed to propylene base polymers. Additional grafted polymers are disclosed in U.S. Pat. No. 5,994,474; U.S. Pat. No. 5,705,565; U.S. Pat. No. 6,414,102; U.S. Pat. No. 6,043,401; U.S. Pat. No. 5,498,809; U.S. Pat. No. 5,266,627; and EP 0850138B1. Grafted blend compositions are disclosed in U.S. Pat. Nos. 6,395,791; 6,583,222; 6,583,188. The following patents/applications are primarily directed to base polymers: U.S. Pat. No. 6,172,015; U.S. Pat. No. 6,335,410; U.S. Pat. No. 4,039,560; U.S. 2003114322 (WO 01/072855); WO 03/087178; WO 03/040201; WO 90/01503; WO 04/031292; and WO 04/035680.

There is a need for silanated polyolefins with excellent adhesion properties for use in adhesive compositions. There is a further need for solvent-free adhesives for both environmental and cost reasons. These issues have been satisfied by the silanated polyolefins of the invention, and adhesive formulations based on these polyolefins. The silanated polymers used in the adhesive formulations have similar performance to the SBC-based, high performance tapes, without the need for a solvent. In addition, the silanated polyolefin polymers described herein are cheaper and safer to use. Moreover, the moisture curable silane chemistry allows one to use hot melt adhesives, such as in automotive, under the hood applications, which require high temperature performance capabilities (104° F. (40° C.) or above). The silanated polyolefins of the invention can be used to prepare adhesive formulations for both hot melt and pressure sensitive applications.

SUMMARY OF THE INVENTION

The invention pertains to silane grafted polyolefins and polyolefin blends, and in particular to compositions containing at least one silane-grafted ethylene/α-olefin polymer having a melt viscosity less than 50,000 cP at 350° F. (177° C.). The silane-grafted and cured ethylene/α-olefin polymers are formed from ethylene/α-olefin polymers having a molecular weight distribution from 1 to 3.5.

The invention also provides for adhesive formulations, based on these silane-grafted ethylene/α-olefin polymers. These adhesive compositions have excellent adhesive properties, including a Peel Adhesion Failure Temperature (PAFT) of greater than, or equal to, 110° F. (43° C.), and a Shear Adhesion Failure Temperature (SAFT) of greater than, or equal to, 140° F. (60° C.).

The invention also provides for the preparation of the silane-grafted ethylene/α-olefin polymers, by reacting an ethylene/α-olefin polymer, having a molecular weight distribution from 1 to 3.5, with at least one silane compound and at least one initiator, and where, the weight ratio of the "at least one silane compound" to the "at least one initiator" is from 20:1 to 400:1, and preferably from 30:1 to 400:1, more preferably from 30:1 to 200:1, even more preferably from 30:1 to 100:1. In another aspect, the weight ratio of the "at least one silane compound" to the "at least one initiator" is from 40:1 to 400:1, preferably from 40:1 to 200:1, and more preferably from 40:1 to 100:1.

The invention also provides for compositions containing at least one silane-grafted ethylene/α-olefin polymer, formed from at least one silane compound, and where the amount of the silane compound that is grafted onto the ethylene/α-olefin polymer is greater than 0.25 weight percent, and preferably greater than 0.5 weight percent, more preferably greater than 1 weight percent, and even more preferably greater than 2 weight percent based on the total weight of the reactive composition.

In one embodiment of the invention, the ethylene/α-olefin polymer contains a ratio of the terminal vinyl groups to the sum of all unsaturations (vinyl, vinylidene, cis, and trans), $R_v$, between 0.001 and 0.5, preferably between 0.01 and 0.4, and more preferably between 0.1 and 0.3, as determined by $^1$H NMR.

The invention also provides for other silane-grafted polyolefins, such as silane-grafted propylene/α-olefin polymers, and provides for silane-grafted polyolefin blends, as discussed below.

The invention further provides for resins and compositions that contain at least one cured silane-grafted ethylene/α-olefin polymer, formed from an ethylene/α-olefin base polymer, and where the composition has better mechanical properties, compared to a similar composition containing the ethylene/α-olefin base polymer instead of the cured silane-grafted ethylene/α-olefin polymer. The mechanical properties for both the inventive composition and the comparative composition are measured using the same test conditions.

The silane grafted polyolefins of the invention may comprise two or more aspects and/or embodiments as described herein.

The compositions of the invention may comprise two or more aspects and/or embodiments as described herein.

The methods or processes of the invention may comprise two or more aspects and/or embodiments as described herein.

DETAILED DESCRIPTION OF THE INVENTION

Silanated Polyolefins

Figure 1:
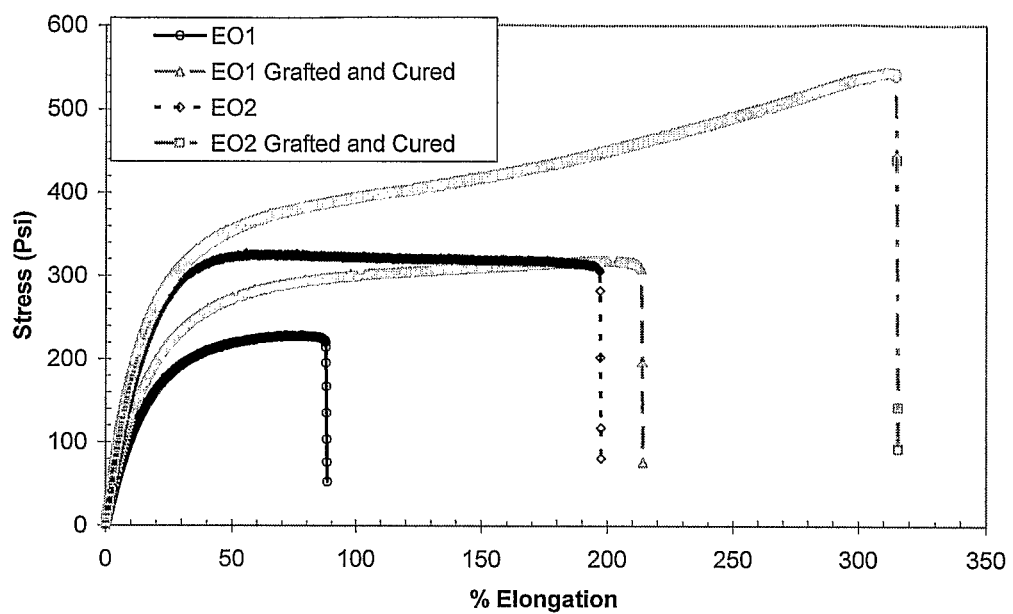
FIG. 1 depicts stress-strain profiles of cured silane-grafted resins and the respective base resins (EO1 and EO2).

The present invention pertains to silane grafted polyolefins and polyolefin blends, and, in particular, to silane-grafted ethylene/α-olefin polymers, having a melt viscosity less than 50,000 cP at 350° F. (177° C.), and compositions based on these polymers. The silane-grafted ethylene/α-olefin polymers are formed from ethylene/α-olefin polymers having a molecular weight distribution from 1 to 3.5. The silane-grafted ethylene/α-olefin polymers can be cured (crosslinked) upon exposure to moisture, and the curing reaction can be accelerated in the presence of a cure catalyst or activator. The invention also provides for adhesive formulations prepared from such silane-grafted ethylene/α-olefin polymers.

In one embodiment, the silane-grafted ethylene/α-olefin polymers have a melt viscosity from 2,000 cP to 50,000 cP. All individual values and subranges from 2,000 cP to 50,000 cP are included and disclosed herein. Melt viscosity is measured using a Brookfield viscometer at 350° F. (177° C.). Preferably, the melt viscosity is from 4,000 cP to 40,000 cP, and more preferably from 5,000 cP and 30,000 cP. In another embodiment, the melt viscosity is from 4,000 cP to 20,000 cP, and more preferably from 6,000 cP and 18,000 cP.

In another embodiment, the silane-grafted ethylene/α-olefin polymers have a number average molecular weight from 5,000 to 25,000, preferably from 6,000 to 20,000, and more preferably from 7,000 to 16,000. All individual values and subranges are included in the range 5,000 to 25,000, and disclosed herein. In another embodiment, the number average molecular weight is from 6,000 to 15,000, and more preferably from 7,000 to 14,000. All molecular weights, as disclosed herein, have the unit "g/mole."

In another embodiment, the silane-grafted ethylene/α-olefin polymers have a weight average molecular weight from 10,000 to 50,000, preferably from 12,000 to 40,000, and more preferably from 14,000 to 32,000. All individual values and subranges are included in the range 10,000 to 50,000, and disclosed herein. In another embodiment, the weight average molecular weight is from 10,000 to 40,000, preferably from 11,000 to 30,000, and more preferably from 12,000 to 26,000. All individual values and subranges are included in the range 10,000 to 40,000, and disclosed herein.

In another embodiment, the silane-grafted ethylene/α-olefin polymers have a molecular weight distribution from 1 to 5, preferably from 1.5 to 4, and more preferably from 2 to 3. All individual values and subranges are included in the molecular weight distribution range 1 to 5, and disclosed herein.

In another embodiment, the silane-grafted ethylene/α-olefin polymers have density from 0.855 g/cm³ to 0.93 g/cm³, and preferably from 0.86 g/cm³ to 0.90 g/cm³, and more preferably from 0.865 g/cm³ to 0.895 g/cm³. All individual values and subranges are included in the density range 0.84 g/cm³ to 0.93 g/cm³, and disclosed herein.

The present invention further provides a process for preparing the silane-grafted ethylene polymers of the invention, by grafting silane moieties to residual unsaturations in the polymer chain and/or to saturated groups in the polymer chain of an ethylene/α-olefin polymer. The polymer may be present in a blend of two or more polyolefins.

In one embodiment, the amount of silane used in the grafting reaction is greater than, or equal to, 2 weight percent, preferably greater than, or equal to, 3 weight percent, and more preferably greater than, or equal to, 5 weight percent, based on the total weight of the reactive composition, and the weight ratio of silane to initiator, is from 20:1 to 400:1, preferably from 30:1 to 400:1, more preferably from 30:1 to 200:1, and even more preferably from 30:1 to 100:1, including all individual ratio values and subranges from 20:1 to 400:1. These individual ratios and subranges are disclosed herein. In another embodiment, the weight ratio of silane to initiator is from 40:1 to 400:1, preferably from 40:1 to 300:1, more preferably from 40:1 to 200:1, and even more preferably from 40:1 to 100:1.

In another embodiment, the amount of silane constituent grafted on the polyolefin chain is greater than 0.5 weight percent, based on the total weight of the reactive composition (or based on the initial weight of silane compound(s) added to reactive composition), as determined by FTIR analysis. In a further embodiment, this amount is greater than one weight percent, and in yet a further embodiment, this amount is greater than two weight percent. All individual values and subranges greater than 0.5 weight percent are considered within the scope of this invention, and are disclosed herein.

In yet another embodiment, the ethylene/α-olefin polymer contains a ratio of the terminal vinyl groups to the sum of all unsaturations (vinyl, vinylidene, cis, and trans), $R_v$, from 0.001 to 0.5, preferably from 0.01 to 0.4, and more preferably from 0.1 to 0.3, as determined by ¹H NMR. All individual ratio values and subranges from 0.001 to 0.5 are included and disclosed herein.

The invention further provides compositions that contain at least one cured silane-grafted ethylene/α-olefin polymer, formed from an ethylene/α-olefin base polymer, and wherein the composition has an average break strength that is greater than the average break strength of a similar composition, comprising the ethylene/α-olefin base polymer instead of the cured silane-grafted ethylene/α-olefin polymer. In a preferred embodiment, the average break strength of the inventive composition is greater than the average break strength of the similar composition by at least 15 percent, preferably by at least 25 percent, and most preferably by at least 50 percent percent.

The invention further provides compositions that contain at least one cured silane-grafted ethylene/α-olefin polymer formed, from an ethylene/α-olefin base polymer, and wherein the composition has an average elongation to break that is greater than the average elongation to break of a similar composition, comprising the ethylene/α-olefin base polymer instead of the cured silane-grafted ethylene/α-olefin polymer. In a preferred embodiment, the average elongation to break of the inventive composition is greater than the average elongation to break of the similar composition by at least 15 percent, preferably by at least 25 percent, and even more preferably by at least 50 percent, and most preferably by at least 100 percent.

The invention further provides compositions that contain at least one cured silane-grafted ethylene/α-olefin polymer, formed from an ethylene/α-olefin base polymer, and wherein the composition has an average energy to break that is greater than the average energy to break of a similar composition, comprising the ethylene/α-olefin base polymer instead of the cured silane-grafted ethylene/α-olefin polymer. In a preferred embodiment the average energy to break of the inventive composition is greater than the average energy to break of the similar composition by at least 15 percent, preferably by at least 25 percent, even more preferably by at least 50 percent, and most preferably by at least than 100 percent or 125 percent.

The invention further provides compositions that contain at least one cured silane-grafted ethylene/α-olefin polymer, and wherein the composition has a storage modulus, G', between 10⁴ and 106 dyn/cm², at a temperature from 100° C. to 15° C.

The invention further provides compositions that contain at least one cured silane-grafted ethylene/α-olefin polymer, and wherein the absolute percent difference in the storage modulus, G', of the inventive composition at 150° C., and the storage modulus of the inventive composition at 100° C., is less than 50 percent, preferably less than 25 percent, and more preferably less than 20 percent.

The invention further provides compositions that contain at least one cured silane-grafted ethylene/α-olefin polymer, formed from an ethylene/α-olefin base polymer, and wherein the composition has a "TMA probe penetration depth at −1 mm", at a temperature that is greater than the "TMA probe penetration depth at −1 mm" of a similar composition, comprising the ethylene/α-olefin base polymer instead of the cured silane-grafted ethylene/α-olefin polymer. In a preferred embodiment the temperature of the "TMA probe penetration depth at −1 mm" of the inventive composition is greater than the temperature at the "TMA probe penetration depth of −1 mm" of the similar composition by at least 4° C., preferably by at least 6° C., and more preferably by at least 8° C.

Silanes

Suitable silanes for the silane crosslinking process include, but are not limited to, those of the general formula (I):

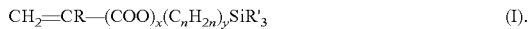
$$CH_2\!=\!CR\!-\!(COO)_x(C_nH_{2n})_y SiR'_3 \qquad (I).$$

In this formula, R is a hydrogen atom or methyl group; x and y are 0 or 1, with the proviso that when x is 1, y is 1; n is an integer from 1 to 12 inclusive, preferably 1 to 4, and each R' independently is an organic group, including, but not limited to, an alkoxy group having from 1 to 12 carbon atoms (for example methoxy, ethoxy, butoxy), aryloxy group (for example phenoxy), araloxy group (for example benzyloxy), aliphatic acyloxy group having from 1 to 12 carbon atoms (for example formyloxy, acetyloxy, propanoyloxy), amino or substituted amino groups (alkylamino, arylamino), or a lower alkyl group having 1 to 6 carbon atoms, with the proviso that not more than one of the three R' groups is an alkyl. In another embodiment, not more than two of the three R' groups is an alkyl.

In addition, any silane, or mixtures of silanes, which will effectively graft to, and crosslink, the ethylene polymers can be used in the practice of this invention. Suitable silanes include unsaturated silanes that comprise both an ethylenically unsaturated hydrocarbyl group, such as a vinyl, allyl, isopropenyl, butenyl, cyclohexenyl or γ-(meth)acryloxy allyl group, and a hydrolyzable group, such as, a hydrocarbyloxy, hydrocarbonyloxy, or hydrocarbylamino group. Examples of hydrolyzable groups include methoxy, ethoxy, formyloxy, acetoxy, proprionyloxy, and alkyl or arylamino groups. Preferred silanes are the unsaturated alkoxy silanes which can be grafted onto the polymer. These silanes and their method of preparation are more fully described in U.S. Pat. No. 5,266,627 to Meverden, et al., which is incorporated herein, in its entirety, by reference. Preferred silanes include vinyltrimethoxysilane, vinyltriethoxysilane, 3-(trimethoxysilyl)propyl methacrylate (γ-(meth)acryloxypropyl trimethoxysilane), and mixtures thereof.

The amount of silane used, can vary depending upon the nature of the ethylene polymer, the silane, the processing conditions, the grafting efficiency, the ultimate application, and similar factors. For adhesive applications of the invention, the amount of silane used in a reactive extrusion to graft a base resin is at least 2 weight percent, preferably at least 4 weight percent or at least 5 weight percent, based on the weight of the reactive composition. In another embodiment, the amount of silane used in a reactive extrusion to graft a base resin is at least 10 weight percent, based on the weight of the reactive composition.

Grafting Reaction

There are several types of compounds that can initiate grafting reactions by decomposing to form free radicals, including azo-containing compounds, carboxylic peroxyacids and peroxyesters, alkyl hydroperoxides, and dialkyl and diacyl peroxides, among others. Many of these compounds and their properties have been described (Reference: J. Branderup, E. Immergut, E. Grulke, eds. "Polymer Handbook," 4th ed., Wiley, New York, 1999, Section II, pp. 1-76.). It is preferable for the species that is formed by the decomposition of the initiator to be an oxygen-based free radical. It is more preferable for the initiator to be selected from carboxylic peroxyesters, peroxyketals, dialkyl peroxides, and diacyl peroxides.

The silane can be grafted to the polymer by any conventional method, typically in the presence of a free radical initiator, for example peroxides and azo compounds, etc., or by ionizing radiation. Organic initiators are preferred, such as any one of the peroxide initiators, for example, dicumyl peroxide, di-tert-butyl peroxide, t-butyl perbenzoate, benzoyl peroxide, cumene hydroperoxide, t-butyl peroctoate, methyl ethyl ketone peroxide, 2,5-dimethyl-2,5-di(tert-butyl peroxy) hexane, lauryl peroxide, and tert-butyl peracetate, t-butyl α-cumyl peroxide, di-t-butyl peroxide, di-t-amyl peroxide, t-amyl peroxybenzoate, 1,1-bis(t-butylperoxy)-3,3,5-trimethylcyclohexane, α,α'-bis(t-butylperoxy)-1,3-diisopropylbenzene, α,α'-bis(t-butylperoxy)-1,4-diisopropylbenzene, 2,5-bis(t-butylperoxy)-2,5-dimethylhexane, and 2,5-bis(t-butylperoxy)-2,5-dimethyl-3-hexyne. A suitable azo compound is azobisisobutyl nitrite.

The amount of initiator and silane employed will affect the final structure of the silane grafted polymer, such as, for example, the degree of grafting in the grafted polymer and the degree of crosslinking in the cured polymer. The resulting structure, will in turn, affect the physical and mechanical properties of the final product. Typically, the amount of initiator and silane employed will not exceed that which is determined to provide the desired level of crosslinking, and the resulting properties in the polymer.

The grafting reaction should be performed under conditions that maximize grafts onto the interpolymer backbone, and minimize side reactions, such as the homopolymerization of the grafting agent, which is not grafted to the olefin interpolymer. The grafting reaction may be performed in the melt, in solution, in the solid-state, in a swollen-state. The silanation may be performed in a wide-variety of equipment, such as, but not limited to, twin screw extruders, single screw extruders, Brabenders, batch reactors.

The amount of initiator can vary, but for the adhesive applications of the invention, at least 100 ppm of initiator, preferably at least 300 ppm of initiator, based on the total amount of the reactive composition, is used. The initiator may be present in an amount from 300 ppm to 1500 ppm or 2000 ppm. All individual values and subranges between 300 ppm and 2000 ppm are included herein and disclosed herein. The weight ratio of silane to initiator also can vary, but for the adhesive applications of the invention, the silane:initiator weight ratio is preferably from 20:1 to 400:1, and more preferably from 30:1 to 400:1, and even more preferably from 48:1 to 350:1, or from 55:1 to 333:1. In another embodiment, the weight ratio of the silane:initiator is preferably from 30:1 to 300:1, and more preferably from 30:1 to 200:1, and even more preferably from 30:1 to 100:1. In another embodiment, the weight ratio of the silane:initiator is from 40:1 to 400:1, preferably from 40:1 to 300:1, and more preferably from 40:1 to 200:1, and even more preferably from 40:1 to 100:1. These ratios of silane to initiator, balanced with the grafting efficiency of the reaction, have resulted in silane-grafted polymers that provide excellent adhesion properties.

It has been found that blending the resin with the silane and initiator in the first stage of an extruder, at melt temperatures typically from 120° C. to 260° C., preferably from 130° C. to 250° C., has produced sufficiently silanated resins. All individual temperature values and ranges from 120° C. to 260° C. are included herein and disclosed herein.

As discussed above, the grafting reaction should be preformed under conditions that maximize grafts onto the polymer backbone, and minimize side reactions, such as the homopolymerization of grafting agent, which is not grafted to the olefin polymer. Some silane agents undergo minimal or no homopolymerization, due to steric features in the molecular structure, low reactivity and/or other reasons.

Cure of Silanated Polyolefin

Cure (crosslinking) is promoted with a crosslinking catalyst, and any catalyst that will effectively promote the crosslinking of the particular grafted silane can be used. These catalysts generally include organic bases, carboxylic acids, and organometallic compounds, including organic titanates and complexes or carboxylates of lead, cobalt, iron, nickel, zinc and tin. Dibutyltindilaurate, dioctyltinmaleate, dibutyltindiacetate, dibutyltindioctoate, stannous acetate, stannous octoate, lead naphthenate, zinc caprylate, and cobalt naphthenate can be used. The amount of catalyst will depend on the particular system at issue. A catalyst or mixture of catalysts may be present in an amount from 0.01 weight percent to 1.0 weight percent, including all individual amounts and subranges there between, and based on the total weight of the components of the composition at issue.

In certain embodiments of the claimed invention, dual crosslinking systems, which use a combination of radiation, heat, moisture and crosslinking steps, may be effectively employed. For instance, it may be desirable to employ peroxide crosslinking agents in conjunction with silane crosslinking agents, peroxide crosslinking agents in conjunction with radiation, or sulfur-containing crosslinking agents in conjunction with silane crosslinking agents. Dual crosslinking systems are disclosed, and claimed in, U.S. Pat. Nos. 5,911,940 and 6,124,370, the entire contents of both are herein incorporated by reference.

Ethylene/α-olefin Polymers

The ethylene/α-olefin polymers used in preparation of the silane-grafted polymers are interpolymers of ethylene and at least one suitable comonomer.

The ethylene/α-olefin polymers used in preparation of the silane-grafted polymers of the invention have a molecular weight distribution ($M_w/M_n$) less than, or equal to, 5, and preferably less than, or equal to, 4. More preferably the ethylene/α-olefin polymers have a molecular weight distribution from 1 to 3.5, and more preferably from 1 to 3. All individual values and subranges from 1 to 5 are included herein and disclosed herein.

Preferred comonomers include, but are not limited to, propylene, isobutylene, 1-butene, 1-pentene, 1-hexene, 3-methyl-1-pentene, 4-methyl-1-pentene, and 1-octene, non-conjugated dienes, polyenes, butadienes, isoprenes, pentadienes, hexadienes (for example, 1,4-hexadiene), octadienes, styrene, halo-substituted styrene, alkyl-substituted styrene, tetrafluoroethylenes, vinylbenzocyclobutene, naphthenics, cycloalkenes (for example, cyclopentene, cyclohexene, cyclooctene), and mixtures thereof. Typically and preferably, the ethylene is copolymerized with one $C_3$-$C_{20}$ α-olefin. Preferred comonomers include propene, 1-butene, 1-pentene, 1-hexene, 1-heptene and 1-octene, and more preferably include propene, 1-butene, 1-hexene and 1-octene.

The ethylene/α-olefin polymers used in preparation of the silane-grafted polymers have a melt viscosity from 2,000 cP to 50,000 cP. All individual values and subranges from 2,000 cP to 50,000 cP are included and disclosed herein. Melt viscosity is measured using a Brookfield viscometer at 350° F. (177° C.). Preferably, the melt viscosity is from 4,000 cP to 40,000 cP, and more preferably from 5,000 cP to 30,000 cP. In another embodiment, the melt viscosity is from 4,000 cP to 20,000 cP, and more preferably from 6,000 cP to 18,000 cP.

In one embodiment, the ethylene/α-olefin polymers used in preparation of the silane-grafted polymers have a melt index (I2) from 200 g/10 min to 3,500 g/10 min, preferably from 250 g/10 min to 1,900 g/10 min, and more preferably from 300 g/10 min to 1,500 g/10 min, as determined using ASTM D-1238 (190° C., 2.16 kg load). All individual values and subranges from 200 g/10 min to 3,500 g/10 min are includes herein and disclosed herein. In another embodiment, the melt index (I2) is from 200 g/10 min to 3,500 g/10 min, preferably from 450 g/10 min to 1,900 g/10 min, and more preferably from 450 g/10 min to 1,500 g/10 min, as determined using ASTM D-1238 (190° C., 2.16 kg load).

In another embodiment, the ethylene/α-olefin polymers used in preparation of the silane-grafted polymers of the invention have a number average molecular weight from 4,000 to 30,000, preferably from 5,000 to 25,000, and more preferably from 6,000 to 14,000. In another embodiment, the number average molecular weight is from 5,000 to 15,000. All individual values and subranges are included in the range 4,000 to 30,000, and disclosed herein. All molecular weights, as disclosed herein, have the unit "g/mole."

In another embodiment, the ethylene/α-olefin polymers used in preparation of the silane-grafted polymers of the invention have a weight average molecular weight from 8,000 to 60,000, preferably from 10,000 to 50,000, and more preferably from 12,000 to 26,000. In another embodiment, the weight average molecular weight is from 10,000 to 30,000. All individual values and subranges are included in the range 8,000 to 60,000, and disclosed herein. All molecular weights, as disclosed herein, have the unit "g/mole."

In another embodiment, the ethylene/α-olefin polymers used in preparation of the silane-grafted polymers of the invention have a percent crystallinity of less than, or equal to, 60 percent, preferably less than, or equal to, 40 percent, and more preferably less than, or equal to, 35 percent, and even more preferably less than, or equal to, 25 percent or 15 percent, as measured by DSC. Preferably, these polymers have a percent crystallinity from 2 percent to 60 percent, including all individual values and subranges from 2 percent to 60 percent. Such individual values and subranges are disclosed herein.

In another embodiment, the ethylene/α-olefin polymers used in preparation of the silane-grafted polymers of the invention have a comonomer incorporation in the final polymer greater than 2 mol %, preferably greater than 3 mol %, based on the total moles of polymerizable monomers. The amount of comonomer incorporation can be greater than 6 mol %, and can even be greater than 10 mol %, based on the total moles of polymerizable monomers.

In another embodiment, the ethylene/α-olefin polymers used in preparation of the silane-grafted polymers of the invention have a density from 0.855 g/cm$^3$ to 0.93 g/cm$^3$, and preferably from 0.86 g/cm$^3$ to 0.90 g/cm$^3$, and more preferably from 0.865 g/cm$^3$ to 0.895 g/cm$^3$. All individual values and subranges from 0.855 g/cm$^3$ to 0.93 g/cm$^3$ are included herein and disclosed herein.

In another embodiment, the ethylene/α-olefin polymers used in preparation of the silane-grafted polymers of the invention have a number average molecular weight ($M_n$) of less than, or equal to, 25,000, with number average molecular weights of 5,000 to 25,000 being most preferred, including all individual values and subranges from 5,000 to 25,000. These individual values and subranges are disclosed herein.

In another embodiment, the ethylene/α-olefin polymers used in preparation of the silane-grafted polymers of the invention have a weight average molecular weight ($M_w$) of less than, or equal to, 40,000, with weight average molecular weights of 10,000 to 40,000 being most preferred, including all individual values and subranges from 10,000 to 40,000. These individual values and subranges are disclosed herein.

Examples of ethylene/α-olefin copolymers suitable for the invention include the AFFINITY™ polymers, available from The Dow Chemical Company. Other examples of ethylene/α-olefin polymers suitable for the invention include the low molecular weight ethylene polymers described in U.S. Pat. Nos. 6,335,410, 6,054,544 and 6,723,810. The entire contents of each of these patents are incorporated herein by reference. Other suitable polymers include ethylene-α-olefins block copolymers and interpolymers, and other ethylene based block copolymers and interpolymers known in the art.

The ethylene/α-olefin polymers used in preparation of the silane-grafted polymers may be "homogeneous" or "homogeneously branched" polymers prepared using the constrained geometry catalysts, as disclosed in U.S. Pat. Nos. 5,064,802; 5,132,380; 5,703,187; 6,034,021; 5,321,106 (EP 0 468 651); U.S. Pat. No. 6,118,013 (EP 0 514 828); and WO 93/19104 (U.S. Pat. Nos. 5,374,696; 5,532,394; 5,723,398); and WO 95/00526 (U.S. Pat. Nos. 5,470,993; 5,556,928; 5,624,878). All of these patents and publications are incorporated by references, herein, in their entirety. Another suitable class of catalysts used to prepare such polymers is the metallocene catalysts disclosed in U.S. Pat. Nos. 5,044,438; 5,057,475; 5,096,867; and 5,324,800, all of which are incorporated by reference, herein, in their entirety. The constrained geometry catalysts may be considered as metallocene catalysts, and both are sometimes referred to as "single-site catalysts." Other suitable polymers for use in the invention are described in U.S. Pat. Nos. 5,272,236; 5,278,272; 6,054,544; 6,335,410 and 6,723,810; all of which are incorporated herein, in their entirety, by reference.

The ethylene/α-olefin polymers used in preparation of the silane-grafted polymers may be polymerized in two reactors, with a first polymer being polymerized in a first reactor, and a second polymer (of higher molecular weight, and/or of different density, and/or, which is heterogeneous) being polymerized in a second reactor, which is connected in series or in parallel to the reactor in which the first polymer is produced. Such a dual polymerization is used to prepare in-reactor polymer blends having desirable properties. An example of this is disclosed in WO 94/00500.

Propylene/α-olefin Polymers

In another embodiment, the above silanation and/or curing reactions can be used to silanate and/or cure other olefin based polymers, in addition to ethylene/α-olefin polymers. For example, the silanation and cure, as described above, of propylene/α-olefin polymers, containing at least 50 mol % polymerized propylene, fall within the invention. Suitable polypropylene base polymers include VERSIFY™ polymers (The Dow Chemical Company) and VISTAMAXX™ polymers (ExxonMobil Chemical Co.), LICOCENE™ polymers (Clariant), EASTOFLEX™ polymers (Eastman Chemical Co.), REXTAC™ polymers (Hunstman), and VESTOPLAST™ polymers (Degussa). Other suitable polymers include propylene-α-olefins block copolymers and interpolymers, and other propylene based block copolymers and interpolymers known in the art.

The invention provides a composition comprising at least one silane-grafted propylene/α-olefin polymer, having a melt viscosity less than 50,000 cP at 350° F. (177° C.).

In a preferred embodiment, the propylene/α-olefin polymers used in preparation of the silane-grafted polymers of the invention have a molecular weight distribution less than, or equal to, 5, and preferably less than, or equal to, 4. More preferably the propylene/α-olefin polymers have a molecular weight distribution from 1.5 to 3.5, and more preferably from 2 to 3. All individual values and subranges from 1.5 to 5 are included herein and disclosed herein.

The propylene/α-olefin polymers used in preparation of the silane-grafted polymers are interpolymers of propylene and at least one suitable comonomer. Preferred comonomers include, but are not limited to, ethylene, isobutylene, 1-butene, 1-pentene, 1-hexene, 3-methyl-1-pentene, 4-methyl-1-pentene, and 1-octene, non-conjugated dienes, polyenes, butadienes, isoprenes, pentadienes, hexadienes (for example, 1,4-hexadiene), octadienes, styrene, halo-substituted styrene, alkyl-substituted styrene, tetrafluoroethylenes, vinylbenzocyclobutene, naphthenics, cycloalkenes (for example, cyclopentene, cyclohexene, cyclooctene), and mixtures thereof. Typically and preferably, the comonomer is a $C_2$ or a $C_4$-$C_{20}$ α-olefin. Preferred comonomers include ethylene, 1-butene, 1-pentene, 1-hexene, 1-heptene and 1-octene, and more preferably include ethylene, 1-butene, 1-hexene and 1-octene.

In one embodiment, the propylene/α-olefin polymers used in preparation of the silane-grafted polymers of the invention have a percent crystallinity of less than, or equal to, 60 percent, preferably less than, or equal to, 40 percent, and more preferably less than, or equal to, 35 percent, as measured by DSC. Preferably, these polymers have a percent crystallinity from 2 percent to 60 percent, including all individual values and subranges from 2 percent to 60 percent. Such individual values and subranges are disclosed herein.

In another embodiment, the propylene/α-olefin polymers used in preparation of the silane-grafted polymers of the invention have a comonomer incorporation in the final polymer greater than 2 mol %, preferably greater than 3 mol %, based on the total moles of polymerizable monomers. The amount of comonomer incorporation can be greater than 6 mol %, and can even be greater than 10 mol %, based on the total moles of polymerizable monomers.

In another embodiment, the propylene/α-olefin polymers used in preparation of the silane-grafted polymers of the invention have a density from 0.855 $g/cm^3$ to 0.895 $g/cm^3$, and preferably from 0.86 $g/cm^3$ to 0.89 $g/cm^3$, and more preferably from 0.86 $g/cm^3$ to 0.88 $g/cm^3$. All individual values and subranges from 0.855 $g/cm^3$ to 0.895 $g/cm^3$, are included herein and disclosed herein.

In one embodiment, the propylene/α-olefin polymers used in preparation of the silane-grafted polymers have a melt viscosity less than 50,000 cP, and preferably from 250 cP to 50,000 cP. All individual values and subranges from 250 cP to 50,000 cP are included and disclosed herein. Melt viscosity is measured using a Brookfield viscometer at 350° F. (177° C.). Preferably, the melt viscosity is from 500 cP to 20,000 cP, and more preferably from 1,000 cP to 10,000 cP.

In another embodiment, the propylene/α-olefin polymers used in preparation of the silane-grafted polymers of the invention have a number average molecular weight from 3,000 to 35,000, preferably from 5,000 to 20,000, and more preferably from 6,000 to 15,000. All individual values and subranges from 3,000 to 35,000 are included and disclosed herein. All molecular weights, as disclosed herein, have the unit "g/mole."

In another embodiment, the propylene/α-olefin polymers used in preparation of the silane-grafted polymers of the invention have a weight average molecular weight from 6,000 to 70,000, preferably from 10,000 to 40,000, and more preferably from 12,000 to 30,000. All individual values and subranges from 6,000 to 70,000 are included and disclosed herein.

Silanated Polyolefin Blends

In another embodiment of the invention, a blend of two of more polyolefins is subject to silanation and/or cure, using the silanes and curing agents as discussed above.

The silane can be reacted with the polymers of the polyolefin blend by blending the individual polymers with the silane and initiator in the first stage of a reactor extruder. The process temperatures at which reaction (silane grafting) takes place are typically between 150° C. and 260° C., preferably between 200° C. and 235° C., depending upon the residence time and the half life of the initiator. The grafting reaction should be performed under conditions that maximize grafts onto the polymer backbone, and minimize side reactions.

In one embodiment, the resin blend contains an ethylene/α-olefin polymer and a propylene/α-olefin polymer. Suitable ethylene/α-olefin polymers and propylene/α-olefin polymers include, but are not limited to, those described above.

Additives

Typically polymers and resins used in the invention are treated with one or more stabilizers, for example, antioxidants, such as Irganox™ 1010 and Irgafos™ 168, both supplied by Ciba Specialty Chemicals. Polymers are typically treated with one or more stabilizers before an extrusion or other melt processes. Other polymeric additives include, but are not limited to, ultraviolet light absorbers, antistatic agents, pigments, dyes, nucleating agents, fillers slip agents, fire retardants, plasticizers, processing aids, lubricants, stabilizers, smoke inhibitors, viscosity control agents and anti-blocking agents.

Adhesive Compositions

Adhesive compositions (hot melt adhesive (HMA) and pressure sensitive adhesives (PSA)), based on one or more silane-grafted polymers or blends, as described above, can prepared by conventional techniques, such as melt blending the constituents of the formulation in a mixing device, with or without curing catalysts. The adhesive compositions of the present invention exhibit better heat resistance in comparison with standard packaging grade hot melt adhesives, designed for application temperatures of 350° F. (177° C.), and also have viscosities which are amenable to application temperatures of less than 300° F. (149° C.).

The viscosity of the adhesive compositions will depend on the end use application. For carton and sealing adhesives, viscosities in the range of 500-1500 cP, at 350° F. (177° C.), are typical.

The adhesive compositions are further characterized as having low densities amenable to recycling and repulping processes. The adhesives exhibit excellent heat resistance, having a Peel Adhesion Temperature (PAFT) values greater than 110° F. (43° C.), preferably greater than 122° F. (50° C.), and more preferably greater than 140° F. (60° C.). The adhesives also exhibit excellent cold temperature flexibility. This combination of properties makes these adhesives well suited for low application temperature packaging adhesives, as well as general purpose packaging adhesives.

The silane-grafted polymers or blends, as discussed above, will preferably be present in amounts from 20 percent to 65 percent by weight, based on the total weight of the adhesive formulation. All individual values and subranges from 20 percent to 65 percent are include herein and disclosed herein. Preferably, the silane-grafted polymers or blends will be present in an amount from 25 percent to 45 percent by weight, and more preferably from 30 percent to 40 percent by weight.

Additionally, or in the alternative, the silane-grafted polymers or blends may be combined with the following: (a) other homopolymers, copolymers and terpolymers of ethylene, including, but not limited to, low density polyethylene, as well as grafted and maleated versions, ethylene vinyl acetate copolymers, ethylene n-butyl acrylate copolymers, ethylene methylacrylate copolymers; (b) homopolymers, copolymers and terpolymers of propylene; (c) rubbery block copolymers, including those having the general configuration A-B-A triblocks, A-B-A-B-A-B multiblocks, A-B diblocks and radial block copolymers; and (d) other olefin-based polymers. Suitable polymers include VERSIFY™ polymers (The Dow Chemical Company) and VISTAMAXX™ polymers (ExxonMobil Chemical Co.), LICOCENE™ polymers (Clariant), EASTOFLEX™ polymers (Eastman Chemical Co.), REXTAC™ polymers (Hunstman), VESTOPLAST™ polymers (Degussa), and high impact polypropylene. Other suitable polymers include low molecular weight polyolefins, as described in U.S. Pat. Nos. 5,917,100; 5,750,813 and 6,107,530; which are all incorporate herein, in their entirety, by reference. The additional polymers may be used in amounts up to about 20 weight percent, however, the amount of the additional polymers may increase or decrease, and will depend on the desired properties and application(s) of the final adhesive.

In one embodiment, an adhesive composition contains at least the following:
a) from 20 percent to 65 percent, by weight in the adhesive, of at least one silane-grafted ethylene/α-olefin polymer, having a melt viscosity less than 50,000 cP (at 350° F. (177° C.)), a molecular weight distribution greater than 1, and less than, or equal to, 3.5, and a density from 0.855 to 0.895 g/cm$^3$;
b) from 10 percent to 60 percent, by weight in the adhesive, of at least one tackifying resin; and
c) from 0 to 40 percent, by weight in the adhesive, of at least one wax.

In another embodiment the adhesive composition contains at least the following:
(a) 25-100 percent, by weight in the adhesive, of at least one silane-grafted ethylene/α-olefin polymer, having a density of 0.86 to 0.88 g/cm$^3$, and a melt viscosity at 350° F. (177° C.) of from 3,500 to 50,000 cP, and preferably from 3,500 to 20,000 cP;
(b) 0-50 percent, by weight in the adhesive, of at least one tackifier;
(c) 0-35 percent, by weight in the adhesive, of at least one wax, which is preferably selected from paraffinic wax, crystalline wax, or a wax prepared from a metallocene or constrained geometry catalyst and having a density of 0.885 to 0.97 g/cm$^3$ and a melt viscosity at 350° F. (177° C.) from 10 to 2,000 cP, or combinations thereof.

In another embodiment, the adhesive composition contains at least one silane-grafted ethylene/α-olefin polymer and/or at least one silane-grafted propylene/α-olefin polymer, and where the silane grafted polymer or polymers are present in an amount from 15 to 50 weight percent, based on the total weight of the composition, and the composition further contains 0 to 40 weight percent of at least one tackifier, based on the total weight of the composition, and 0 to 40 weight percent of at least one oil, based on the total weight of the composition.

In another embodiment, the adhesive composition contains at least one silane-grafted ethylene/α-olefin polymer and/or at least one silane-grafted propylene/α-olefin polymer, and where the silane grafted polymer or polymers are present in an amount from 15 to 50 weight percent, based on the total weight of the composition, and the composition further comprises 0 to 40 weight percent of at least one tackifier, based on the total weight of the composition, and 0 to 40 weight percent of at least one wax, based on the total weight of the composition.

In another embodiment, the adhesives composition contains at least one silane-grafted ethylene/α-olefin polymer and/or at least one silane-grafted propylene/α-olefin polymer, and the composition has a
a) Peel Adhesion Failure Temperature (PAFT) of greater than, or equal to, 110° F. (43° C.), and/or
b) a Shear Adhesion Failure Temperature (SAFT) of greater than, or equal to, 140° F. (60° C.).

In another embodiment, the invention provides compositions comprising at least one silane-grafted ethylene/α-olefin polymer and/or at least one silane-grafted propylene/α-olefin polymer, and at least one styrene-ethylene-butylene-styrene (SEBS) polymer. In a further embodiment, the composition further comprises at least one tackifier, and/or at least one oil and/or at least one wax.

The waxes useful herein include, but are not limited to, paraffin waxes, microcrystalline waxes, high density, low molecular weight polyethylene waxes, thermally degraded waxes, by-product polyethylene waxes, Fischer-Tropsch waxes, oxidized Fischer-Tropsch waxes and functionalized waxes such as hydroxy stearamide waxes and fatty amide waxes. It is common in the art to use the terminology "synthetic high melting point waxes" to include high density, low molecular weight polyethylene waxes, by-product polyethylene waxes and Fischer-Tropsch waxes. Suitable waxes also include those described in U.S. Pat. Nos. 6,335,410; 6,054,544 and 6,723,810; which are all incorporated herein, in their entirety, by reference.

Exemplary tackifying resins include, but are not limited to, aliphatic, cycloaliphatic and aromatic hydrocarbons and modified hydrocarbons and hydrogenated versions; terpenes and modified terpenes and hydrogenated versions; and rosins and rosin derivatives and hydrogenated versions; and mixtures thereof. Tackifying resins having a ring and ball softening point from 70° C. to 150° C., will typically have a viscosity at 350° F. (177° C.), as measured using a Brookfield viscometer, of no more than 3000 centipoise. Useful examples include Eastotac® H-100, H-115 and H-130, and H-142 from Eastman Chemical Co. in Kingsport, Tenn., which are partially hydrogenated cycloaliphatic petroleum hydrocarbon resins, with softening points of 100° C., 115° C. and 130° C. and 142° C., respectively. These resins are available in the E grade, R grade, L grade and W grade, indicating differing levels of hydrogenation, with E being the least hydrogenated and W being the most hydrogenated.

Other useful tackifying resins include Escorez® 5300, 5637 and 5400, partially hydrogenated cycloaliphatic petroleum hydrocarbon resins, and Escorez® 5600, a partially hydrogenated aromatic modified petroleum hydrocarbon resin. All of these resins are available from ExxonMobil Chemical Co., in Houston, Tex. Other tackifying resins include Wingtack® Extra, which is an aliphatic, aromatic petroleum hydrocarbon resin available from Goodyear Chemical Co., in Akron, Ohio; Hercolite® 2100, a partially hydrogenated cycloaliphatic petroleum hydrocarbon resin; and Zonatac® 105 and 501 Lite, which are styrenated terpene resins made from d-limonene and available from Arizona Chemical Co., in Panama City, Fla.

Stabilizer and antioxidants may be added to protect the adhesive from degradation, caused by reactions with oxygen, which are induced by such things as heat, light or residual catalyst from the raw materials. Lowering the temperature of application, as in the present invention, also helps to reduce degradation. Such antioxidants are commercially available from Ciba-Geigy located in Hawthorn, N.Y., and include Irganox® 565, 1010 and 1076 which are hindered phenolic antioxidants. These are primary antioxidants which act as free radical scavengers, and may be used alone or in combination with other antioxidants such as phosphite antioxidants, like Irgafos® 168, available from Ciba-Geigy. Phosphite antioxidants are considered secondary antioxidants, that not generally used alone, and are primarily used as peroxide decomposers. Other available antioxidants include, but are not limited to, Cyanox® LTDP, available from Cytec Industries in Stamford, Conn., and Ethanox® 1330, available from Albemarle Corp. in Baton Rouge, La. Many other antioxidants are available for use by themselves, or in combination with other such antioxidants. When employed, the antioxidant is typically present in an amount less than 0.5 weight percent, preferably less than 0.2 weight percent, based on the total weight of the adhesive formulation.

The adhesive may further comprise an oil. Oils are typically employed to reduce the viscosity of the pressure sensitive adhesive. When employed, oils will be present in an amount less than 50, preferably less than 40, and more preferably less than 35 weight percent, based on the weight of the adhesive formulation. Exemplary classes of oils include, but are not limited to, white mineral oil (such as Kaydol® oil available from Witco), and Shellflex® 371 naphthenic oil (available from Shell Oil Company) and Calsol 5550 (napthenic oil from Calumet Lubricants).

The adhesive formulations may also contain one or more crosslinking catalysts, as discussed above.

The adhesives may be prepared by standard melt blending procedures. In particular, the silane-grafted polymer or blend, tackifier(s) and other components may be melt blended under an inert gas blanket, until a homogeneous mix is obtained. Any mixing method producing a homogeneous blend, without degrading the adhesive components is satisfactory, such as a vessel equipped with a stirrer, and an optional heating mechanism. The blending of the components may take place at room temperature, or at a temperature above or below room temperature, depending on the nature of the components to be blended.

Further, the components of an adhesive formulation may be added to an extrusion coater for application to the substrate. The adhesives can be provided in forms, such as pellets, pillows, or any other desired configurations.

The adhesives are ideally suited for use in the packaging industry for case and carton sealing and for tray forming. These packages may be manufactured from materials, such as virgin and recycled kraft, high and low density kraft, chipboard and various types of treated and coated kraft and chipboard, and corrugated versions of these materials. These adhesives may also bond composite materials, such as those types of packages used for packaging of alcoholic beverages. These composite materials may include chipboard laminated with an aluminum foil, which is further laminated to film materials, such as polyethylene, Mylar™, polypropylene, polyvinylidene chloride, ethylene vinyl acetate and various other types of films. Such film materials may also be bonded directly to chipboard or kraft in the absence of aluminum foil. One of ordinary skill in the art would recognize that the adhesive formulations of the invention can be used with a variety of substrates used in the packaging industry.

The adhesives may also be used in a variety of application, including, but not limited to, case and carton sealing, automotive, graphic arts, nonwovens, panel assembly, high performance tapes, woodworking HMAs, contact hot melt adhesives, paperboard coatings, inks, personal care and cosmetic products, sealants, color and additive concentrates, carpet-tape adhesives, woodworking adhesives, and profile wrap adhesives.

Other Applications Based on the Silane-Grafted Polymers and Blends

The silane-grafted polymers or blends can be blended with one or more thermoplastic or thermosetting polymers, and used in other applications.

Thermoplastic polymers include the natural or synthetic resins, such as, for example, styrene block copolymers, rubbers, linear low density polyethylene (LLDPE), high density polyethylne (HDPE), low density polyethylene (LDPE), ethylene/vinyl acetate (EVA) copolymer, ethylene-carboxylic acid copolymers (EAA), ethylene acrylate copolymers, polybutylene, polybutadiene, nylons, polycarbonates, polyesters, polypropylene, ethylene-propylene interpolymers such as ethylene-propylene rubber, ethylene-propylene-diene monomer rubbers, chlorinated polyethylene, thermoplastic vulcanates, ethylene ethylacrylate polymers (EEA), ethylene styrene interpolymers (ESI), polyurethanes, as well as graft-modified olefin polymers, and combinations of two or more of these polymers.

The blend compositions of the present invention can be used in a variety of applications including thermoforming, blow molding, injection molding and overmolding, calendering, fiber forming processes, wire and cable, extrusion coatings and dispersions.

Processing aids, which are also referred to as plasticizers, can also be included in either the individual blend components or added to the final blend. These include, but are not limited to, the phthalates, such as dioctyl phthalate and diisobutyl phthalate, natural oils such as lanolin, and paraffin, naphthenic and aromatic oils obtained from petroleum refining, and liquid resins from rosin or petroleum feedstocks. Exemplary classes of oils useful as processing aids include white mineral oil such as Kaydol™ oil (available from and a registered trademark of Witco) and Shellflex™ 371 naphthenic oil (available from and a registered trademark of Shell Oil Company). Another suitable oil is Tuflo™ oil (available from and a registered trademark of Lyondell).

The silane-grafted polymers of the present invention can also be used to enhance polymer adhesion in hot melt adhesives, extrusion coating and lamination systems, when used as a blend component.

Yet another advantage of the silane-grafted polymers of the present invention is that their low crystallinities allow them to be loaded with high levels of fillers (for example, talc, carbon black, silica, magnesium hydroxide, calcium carbonate, aluminum trihydrate, etc.) and/or other additives such as antioxidants (for example, Irganox 1010, a hindered phenolic; Irgafos 168, a phosphite; etc.), cling additives (for example, polyisobutylene), antiblock additives, colorants, pigments, waxes, nucleating agents, extender oils, flame retardants, and tackifers. The amount of filler that can be incorporated into the silane-grafted polymer is limited only by the molecular structure of the filler-containing composition, and/or the extent that the filler does not interfere with the other enhancements brought by the polymer. Solids levels of 70 wt percent, 80 wt percent, or more, based on the combined weight of the composition and filler may be achieved. This high loading capacity is particularly useful in masterbatch applications, for example, using a relatively small amount of polymer to introduce one or more fillers and/or additives into a much larger amount of a composition.

Definitions

Any numerical range recited herein, includes all values from the lower value to the upper value, in increments of one unit, provided that there is a separation of at least two units between any lower value and any higher value. As an example, if it is stated that a compositional, physical or mechanical property, such as, for example, molecular weight, viscosity, melt index, etc., is from 100 to 1,000, it is intended that all individual values, such as 100, 101, 102, etc., and sub ranges, such as 100 to 144, 155 to 170, 197 to 200, etc., are expressly enumerated in this specification. For ranges containing values which are less than one, or containing fractional numbers greater than one (for example, 1.1, 1.5, etc.), one unit is considered to be 0.0001, 0.001, 0.01 or 0.1, as appropriate. For ranges containing numbers less than ten (for example, 1 to 5), one unit is typically considered to be 0.1. These are only examples of what is specifically intended, and all possible combinations of numerical values between the lowest value and the highest value enumerated, are to be considered to be expressly stated in this application. Numerical ranges have been recited, as discussed herein, in reference to melt viscosity, melt index, number average molecular weight, weight average molecular weight, molecular weight distribution, various temperatures ($T_m$, $T_c$), percent crystallinity, amount of silane, amount of initiator, amount of curing catalyst, silane:initiator ratio, percent comonomer, amount of grafted silane, ratio of terminal vinyl unsaturation, density and other properties.

The term "composition," as used herein, includes a mixture of materials which comprise the composition, as well as reaction products and decomposition products formed from the materials of the composition.

The terms "blend" or "polymer blend," as used herein, mean a blend of two or more polymers. Such a blend may or may not be miscible. Such a blend may or may not be phase separated. Such a blend may or may not contain one or more domain configurations, as determined from transmission electron spectroscopy.

The term "polymer," as used herein, refers to a polymeric compound prepared by polymerizing monomers whether of the same or a different type. The generic term polymer thus embraces the term homopolymer, usually employed to refer to polymers prepared from only one type of monomer, and the term interpolymer as defined hereinafter. The terms "ethylene/α-olefin polymer" and "propylene/α-olefin polymer" are indicative of interpolymers as described below.

The term "interpolymer," as used herein, refers to polymers prepared by the polymerization of at least two different types of monomers. The generic term interpolymer thus includes copolymers, usually employed to refer to polymers prepared from two different monomers, and polymers prepared from more than two different types of monomers.

The term, "ethylene/α-olefin polymer," as used herein, refers to an ethylene-based interpolymer that contains 50 mol percent or more polymerized ethylene monomers.

The term, "propylene/α-olefin polymer," as used herein, refers to a propylene-based interpolymer that contains 50 mol percent or more polymerized propylene monomers.

The term "silane-grafted," as used herein, refers to the chemical linkage of moieties containing silane, derived from one or more silane agents, on the backbone of a polymeric structure. Such moieties may be linked within the polymeric structure (as pendant groups), or linked at a terminal of the polymer structure, and one or more silane moieties may be linked together at a particular position along the backbone. In addition, this term also includes minor amounts of silane moieties that connect two or more polymeric chains by a crosslinking reaction, prior to any significant degree of crosslinking of the grafted polymer.

The terms "homogeneous" and "homogeneously-branched" are used in reference to an ethylene/α-olefin polymer (or interpolymer), in which the α-olefin comonomer is randomly distributed within a given polymer molecule, and substantially all of the polymer molecules have the same ethylene-to-comonomer ratio.

The homogeneously branched ethylene interpolymers that can be used in the practice of this invention include linear ethylene interpolymers, and substantially linear ethylene interpolymers.

Included amongst the homogeneously branched linear ethylene interpolymers are ethylene polymers, which lack long chain branching, but do have short chain branches, derived from the comonomer polymerized into the interpolymer, and which are homogeneously distributed, both within the same polymer chain, and between different polymer chains. That is, homogeneously branched linear ethylene interpolymers lack long chain branching, just as is the case for the linear low density polyethylene polymers or linear high density polyethylene polymers, made using uniform branching distribution polymerization processes as described, for example, by Elston in U.S. Pat. No. 3,645,992. Commercial examples of homogeneously branched linear ethylene/α-olefin interpolymers include TAFMER™ polymers supplied by the Mitsui Chemical Company and EXACT™ polymers supplied by ExxonMobil Chemical Company.

The substantially linear ethylene interpolymers used in the present invention are described in U.S. Pat. Nos. 5,272,236; 5,278,272; 6,054,544; 6,335,410 and 6,723,810; the entire contents of each are herein incorporated by reference. The substantially linear ethylene interpolymers are those in which the comonomer is randomly distributed within a given interpolymer molecule, and in which substantially all of the interpolymer molecules have the same ethylene/comonomer ratio within that interpolymer.

In addition, the substantially linear ethylene interpolymers are homogeneously branched ethylene polymers having long chain branching. The long chain branches have the same comonomer distribution as the polymer backbone, and can have about the same length as the length of the polymer backbone. "Substantially linear," typically, is in reference to a polymer that is substituted, on average, with 0.01 long chain branches per 1000 total carbons (including both backbone and branch carbons) to 3 long chain branches per 1000 total carbons.

Some polymers may be substituted with 0.01 long chain branches per 1000 total carbons to 1 long chain branch per 1000 total carbons, more preferably from 0.05 long chain branches per 1000 total carbons to 1 long chain branch per 1000 total carbons, and especially from 0.3 long chain branches per 1000 total carbons to 1 long chain branch per 1000 total carbons.

Commercial examples of substantially linear polymers include the ENGAGE™ polymers and AFFINITY™ polymers (both available from The Dow Chemical Company).

The substantially linear ethylene interpolymers form a unique class of homogeneously branched ethylene polymers. They differ substantially from the well-known class of conventional, homogeneously branched linear ethylene interpolymers, described by Elston in U.S. Pat. No. 3,645,992, and, moreover, they are not in the same class as conventional heterogeneous Ziegler-Natta catalyst polymerized linear ethylene polymers (for example, ultra low density polyethylene (ULDPE), linear low density polyethylene (LLDPE) or high density polyethylene (HDPE) made, for example, using the technique disclosed by Anderson et al. in U.S. Pat. No. 4,076,698); nor are they in the same class as high pressure, free-radical initiated, highly branched polyethylenes, such as, for example, low density polyethylene (LDPE), ethylene-acrylic acid (EAA) copolymers and ethylene vinyl acetate (EVA) copolymers.

The homogeneously branched, substantially linear ethylene interpolymers useful in the invention have excellent processability, even though they have a relatively narrow molecular weight distribution. Surprisingly, the melt flow ratio ($I_{10}/I_2$), according to ASTM D-1238, of the substantially linear ethylene interpolymers can be varied widely, and essentially independently of the molecular weight distribution ($M_w/M_n$ or MWD). This surprising behavior is completely contrary to conventional homogeneously branched linear ethylene interpolymers, such as those described, for example, by Elston in U.S. Pat. No. 3,645,992, and heterogeneously branched conventional Ziegler-Natta polymerized linear polyethylene interpolymers, such as those described, for example, by Anderson et al., in U.S. Pat. No. 4,076,698. Unlike substantially linear ethylene interpolymers, linear ethylene interpolymers (whether homogeneously or heterogeneously branched) have rheological properties, such that, as the molecular weight distribution increases, the $I_{10}/I_2$ value also increases.

"Backbone" refers to a discrete molecule, and "polymer" or "bulk polymer," refer, in the conventional sense, to the polymer as formed in a reactor.

"Long chain branching (LCB)" can be determined by conventional techniques known in the industry, such as $^{13}C$ nuclear magnetic resonance ($^{13}C$ NMR) spectroscopy, using, for example, the method of Randall (Rev. Micromole. Chem. Phys., C29 (2& 3), p. 285-297). Two other methods are gel permeation chromatography, coupled with a low angle laser light scattering detector (GPC-LALLS), and gel permeation chromatography, coupled with a differential viscometer detector (GPC-DV). The use of these techniques for long chain branch detection, and the underlying theories, have been well documented in the literature. See, for example, Zimm, B. H. and Stockmayer, W. H., J. Chem. Phys., 17, 1301 (1949) and Rudin, A., Modern Methods of Polymer Characterization, John Wiley & Sons, New York (1991) pp. 103-112.

In contrast to "substantially linear ethylene polymer," "linear ethylene polymer" means that the polymer lacks measurable or demonstrable long chain branches, that is, typically, the polymer is substituted with an average of less than 0.01 long chain branch per 1000 total carbons.

Measurements

Melt viscosity is determined in accordance with the following procedure, using a Brookfield Laboratories DVII+ Viscometer and disposable aluminum sample chambers. The spindle used, in general, is a SC-31 hot-melt spindle, suitable for measuring viscosities in the range of from 10 to 100,000 centipoises. The sample is poured into the chamber, which is in turn, inserted into a Brookfield Thermosel and locked into place. The sample chamber has a notch on the bottom that fits the bottom of the Brookfield Thermosel to ensure that the chamber is not allowed to turn when the spindle is inserted and spinning. The sample is heated to the required temperature, until the melted sample is about 1 inch (approximately 8 grams of resin) below the top of the sample chamber. The viscometer apparatus is lowered and the spindle submerged into the sample chamber. Lowering is continued until brackets on the viscometer align on the Thermosel. The viscometer is turned on, and set to operate at a shear rate which leads to a torque reading in the range of 30 to 60 percent. Readings are taken every minute for about 15 minutes or until the values stabilize, at which point, a final reading is recorded.

The average molecular weights and molecular weight distributions for ethylene-base polymers are determined with a chromatographic system consisting of either a Polymer Laboratories Model PL-210 or a Polymer Laboratories Model PL-220. The column and carousel compartments are operated at 140° C. for polyethylene-based polymers. The columns are three Polymer Laboratories 10-micron Mixed-B columns. The solvent is 1,2,4 trichlorobenzene. The samples are prepared at a concentration of 0.1 gram of polymer in 50 milliliters of solvent. The solvent used to prepare the samples contains 200 ppm of butylated hydroxytoluene (BHT). Samples are prepared by agitating lightly for 2 hours at 160° C. The injection volume is 100 microliters and the flow rate is 1.0 milliliters/minute. Calibration of the GPC column set is performed with narrow molecular weight distribution polystyrene standards, purchased from Polymer Laboratories (UK). The polystyrene standard peak molecular weights are converted to polyethylene molecular weights using the following equation (as described in Williams and Ward, J. Polym. Sci., Polym. Let., 6, 621 (1968)):

$$M_{polyethylene} = A \times (M_{polystyrene})^B,$$

where M is the molecular weight, A has a value of 0.4315 and B is equal to 1.0. Polyethylene equivalent molecular weight calculations were performed using Viscotek TriSEC software Version 3.0. The molecular weights for polypropylene-based polymers can be determined using Mark-Houwink ratios according to ASTM D6474.9714-1, where, for polystyrene a=0.702 and log K=−3.9, and for polypropylene, a=0.725 and log K=−3.721. For polypropylene-based samples, the column and carousel compartments are operated at 160° C.

By the term "MI," is meant melt index, $I_2$, in g/10 min, measured using ASTM D-1238, Condition 190° C./2.16 kg for polyethylene base polymers (Condition 230° C./2.16 kg for polypropylene base polymers). Melt indexes are also determined from Brookfield viscosity as described in U.S. Pat. Nos. 6,335,410; 6,054,544; 6,723,810.

The notation "$I_{10}$" refers to a melt index, in g/10 min, measured using ASTM D-1238, Condition 190° C./10.0 kg.

Differential Scanning Calorimetry (DSC) is used to measure crystallinity in polyethylene (PE) based samples and polypropylene (PP) based samples. A sample is pressed into a thin film at a temperature of 190° C. About 5 to 8 mg of film sample is weighed and placed in a DSC pan. The lid is crimped on the pan to ensure a closed atmosphere. The sample pan is placed in a DSC cell, and then heated, at a rate of approximately 10° C./min, to a temperature of 180° C. for PE (230° C. for PP). The sample is kept at this temperature for three minutes. Then the sample is cooled at a rate of 10° C./min to −60° C. for PE (−40° C. for PP), and kept isothermally at that temperature for three minutes. The sample is next heated at a rate of 10° C./min until complete melting (second heat). The percent crystallinity is calculated by dividing the heat of fusion ($H_f$), determined from the second heat curve, by a theoretical heat of fusion of 292 J/g for PE (165 J/g, for PP), and multiplying this quantity by 100 (for example, % cryst.=($H_f$/292 J/g)×100 (for PE)).

Unless otherwise stated, melting point(s) ($T_m$) of each interpolymer sample (base polymer, silane-grafted polymer and cured silane-grafted polymer) is determined from the second heat curve obtained from DSC, as described above. The crystallization temperature ($T_c$) is measured from the first cooling curve.

Density is measured in accordance with ASTM D-792. The density measured was a "quick density", meaning that the density was determined after 1 hour from the time of molding.

The % xylene extractables were measured according to ASTM D-2765 Procedure A.

Proton Nuclear Magnetic Resonance ($^1$H NMR) Spectroscopy—End Group $^1$H NMR analysis was used to determine the end group structure. Samples were prepared by adding approximately 0.100 g of polymer in 2.5 ml of solvent in a 10 mm NMR tube. The solvent was a 50/50 mixture of 1,1,2,2-tetrachloroethane-d2 and perchlorethylene. The samples were dissolved and homogenized by heating and vortexing the tube, and its contents, at 110° C. The data were collected using a Varian Unity Plus 400 MHz NMR spectrometer. The acquisition parameters used for the Presat experiment include a pulse width of 30 ps, 200 transients per data file, a 1.6 sec acquisition time, a spectral width of 10000 Hz, a file size of 32K data points, temperature setpoint 110° C., D1 delay time 4.40 sec, Satdly 4.0 sec, and a Satpwr of 16.

The ratio of the terminal vinyl groups to the sum of all of the unsaturations, $R_v$, is defined below. As mentioned above, $R_v$ may be determined using $^1$H NMR spectroscopy, or if that is indeterminative, by $^{13}$C NMR spectroscopy, under conditions where the intensity of the peaks corresponding to the different carbons in the sample is directly proportional to the total number of contributing nuclei in the sample. The $R_v$, value is defined as:

$$R_v = \frac{[\text{vinyl}]}{[\text{vinyl}] + [\text{vinylidene}] + [cis] + [trans]},$$

where [vinyl] is the concentration of vinyl groups in the isolated polymer in vinyls/1,000 carbon atoms; [vinylidene], [cis], and [trans] are the concentration of vinylidene, cis and trans groups in the isolated polymer in amount/1,000 carbon atoms, respectively.

Fourier Transform Infrared Spectroscopy (FTIR) Analysis

The amount of silane in random ethylene/octene copolymers grafted with vinyltriethoxysilane (VTES) was determined by Fourier Transform Infrared Spectroscopy (FTIR). For other polymers and/or other silanating agents, one skilled in the art can run the appropriate calibrations to determine the silane content from FTIR.

From the silane-grafted polymer, a sample film of 7-10 mils thickness was formed in a hydraulic press by heating on low (contact) pressure at 75° C. for 2 minutes and high pressure (20,000 psi) for 1 minute. The sample was removed from the press and cooled to room temperature. The sample was then placed in a film holder and put in a vacuum oven at 50° C. for 1 hour. FTIR spectra were collected after the sample had been in the oven for one hour and after the sample had been held for 24 hours at room temperature. Regarding the FTIR spectra, 64 scans were collected at 4 cm$^{-1}$ resolution in absorbance. The net absorbance was calculated of the following two peaks using a baseline tangent to the two minima noted.

| 1105 cm$^{-1}$ (Si—O) | 1153-993 cm$^{-1}$ |
| 2023 cm$^{-1}$ (thickness) | 1955-2114 cm$^{-1}$ |

Spectra were collected after 1 hour in the oven and again after 24 hours at room temperature (the initial oven aging will remove 95 percent of the ungrafted silane). The percent vinyl triethylene silane (% VTES) is determined by the ratio of the 1105 cm$^{-1}$ peak to the 2023 cm$^{-1}$ peak. This ratio value is used in the following equation to determine the percent VTES.

% VTES=(0.1156×peak height 1105 cm$^{-1}$)+0.0345 peak height 2023 cm$^{-1}$.

Mechanical Analyses

Micro tensile specimens were pulled at 5"/min on a Model 1125 Instron tensile frame, in accordance with ASTM D-1708. Specimens were held with air actuated grips (60 psi) and monitored using a 1000 lb calibrated load cell. The test was run at a 20 lb full scale range.

Solid state dynamic mechanical spectroscopy (DMS) data were gathered in a torsion mode on a Rheometrics (now TA) ARES from −100° C. to ~180° C. in 5° C. steps at 1 rad/s in a nitrogen purge.

Thermomechanical analyzer (TMA) data were gathered on samples melt pressed at 190° C., which were air-cooled to room temperature. The samples were at least about 0.2 mm (8 mil) thick. The typical probe force used was 102 gm (1 N). This probe force was applied continuously. The probe diameter was 1.0 mm (40 mil). The sample was heated at a rate of 5° C./min in nitrogen.

Programmed Oven Peels (100 g) and Programmed Oven Shears (500 g) (PAFT and SAFT)

Each sample was coated onto Kraft paper by hand using glass rods or shims. The resultant coating is a 1 inch (2.5 cm) wide band that is about 8-10 mils or 0.008 to 0.010 inches (0.2 to 0.25 mm) thick. The adhesive bonds were cured at 25° C., 54 percent relative humidity (RH) and tested at 8, 24, 48, 72, 96, 144, 192, 336, and 500 hours.

The PAFT and SAFT were determined by placing samples in a programmed oven with 100 gram weights for the peel mode (PAFT) and 500 gram weights for the shear mode (SAFT), ramping the temperature up from 25° C. to 175° C. at a rate of 25° C./hour according to ASTM D-4498. The oven automatically records the temperature at which the samples fail. The reported result is the average failure temperature of four to five bonds.

Fiber Tear Test

Fiber tear was conducted on Inland Container's "High Performance" corrugated board stock, 100 percent virgin content, 58#. Percent fiber tear on corrugated paper board stock is conducted according to standard industry test methods. The adhesive is heated to 350° F./177° C. and is applied on the board stock cut into 1×3 in (25×76 mm) rectangular sheets, with the corrugated flutes running lengthwise. The adhesive to be tested is applied, running lengthwise, as about a 5 mm/0.2 in wide strip, and may be drawn down with a spatula or hot melt applicator. Then a second strip is applied within 2 seconds and held, with moderate pressure, for 5 seconds to laminate.

The samples were cured for 24 hours at room temperature and 54 percent RH (Relative Humidity), and in another case, were cured for 72 hours at room temperature and 54 percent RH. The bonds cured for 24 hours at room temperature and 54 percent RH, were then pulled apart at the test temperature of 0° F., 35° F., 120° F., or 140° F. The bonds cured for 72 hours at room temperature and 54 percent RH were pulled apart at a test temperature of 160° F. In order to tear the bond at the test temperature, the bond was tested immediately, after the conditioning period ended. The bond was torn by inserting the blade of a spatula under one corner to fold up the corner. The bond was then placed on a horizontal surface, with the side with the folded corner faced up. The folded corner was hand grabbed, and the bond was torn. With the laminate held as near as possible to the source of heating or cooling in order to maintain the conditioning temperature, the folded corner is manually pulled as rapidly as possible at roughly a 45 to 90 degree angle relative to each sheet's lengthwise axis to tear the adhesive bond. The percent of torn fiber is estimated (fiber tear or FT) in 25 percent increments; that is, 0 percent, 25 percent, 50 percent, 75 percent and 100 percent. Unless otherwise stated, the FT test is normally repeated on five replicate samples, and the average of these five runs is reported.

Sample Preparation of Hot Melt or Pressure Sensitive Adhesives

The tackifier, oil and catalyst were blended together at 150° C. The resin (silane grafted) was added to the blend, and the final composition was mixed until a smooth, homogeneous mixture resulted. In general, the adhesives of the invention may be prepared by standard melt blending procedures. In particular, the polymer(s), tackifier(s), and optional plasticizer(s) or wax(s) may be melt blended at an elevated temperature (from 150° C. to 200° C.), under an inert gas blanket, until a homogeneous mix is obtained. Any mixing method producing a homogeneous blend, without degrading the components, is satisfactory, such as, through the use of a heated vessel equipped with a stirrer.

Peel Test Procedure

The adhesives were hot melt coated onto Mylar film at 25 gsm (grams per square meter), and conditioned at 25° C. and 54 percent RH. At the following time periods 48, 72, 96, 144, 216, 264 and 336 hours, the 1-inch wide strips were removed from the conditioning chamber, and peel testing to stainless steel was conducted using PSTC-1 test protocol at a rate of 12"/minute on an I-Mass slip peel tester.

The polymers, compositions and processes of this invention, and their use, are more fully described by the following examples. The following examples are provided for the purpose of illustrating the invention, and are not to be construed as limiting the scope of the invention.

EXAMPLES

Silane Grafting of High Melt Flow Polyolefins using Reactive Extrusion

Three random ethylene/octene copolymers, EO1, EO2, and EO (200 MI), with the properties discussed below, were silane grafted. The silane to peroxide ratio in the liquid masterbatch varied from 55:1 to 333:1. The resin and the silane/peroxide masterbatch were fed into the extruder at a certain wt % of the masterbatch. Both the EO1 and EO2 copolymers were stabilized with Irganox™ 1010, available from Ciba Specialty Chemicals.

EO1 is a random ethylene/octene copolymer with the following properties: density of 0.87 g/cc, melt viscosity of 8200 cP at 350° F. (177° C.), an apparent melt index ($I_2$) of 1000 g/10 min at 190° C./2.16 kg, and a percent crystallinity around 16.

EO2 is a random ethylene/octene copolymer with a density of 0.874 g/cc, a melt viscosity of 17,000 cP at 350° F. (177° C.), an apparent melt index ($I_2$) of 500 g/10 min at 190° C./2.16 kg, and a percent crystallinity around 18.

EO (200 MI) is a random ethylene/octene copolymer with a density of 0.870 g/cc, and an apparent melt index ($I_2$) of 200 g/10 min at 190° C./2.16 kg.

Melt index (apparent) was calculated from the following equation (see U.S. Pat. No. 6,335,410): $I_2$ (190° C./2.16 kg)=$3.6126[10^{(log(\eta)-6.6928)/-1.1363}]-9.3185$, where $\eta$=melt viscosity, in cP, at 350° F.

Representative Procedure

The EO1 copolymer and a liquid silane/peroxide masterbatch mixture containing 10 wt % vinyltriethoxysilane (VTES, 0.87 lb (0.395 kg)) and 600 ppm Trignox® 101 (2,5-dimethyl-2,5-di(tert-butyl peroxy)hexane, 4.1 g) were simultaneously added to the feed throat of a co-rotating twin screw, continuous extruder (Werner & Pfleiderer-ZSK 30, with an eleven barrel section extruder). Each barrel section was 90 mm in length, and the barrel sections were stacked length-to-length. The temperatures of the internal barrel sections 3-9 were set at 235° C., and the internal temperatures varied from 140° C. to 235° C. Barrel sections 1, 2, 10 and 11 were not heated, but the temperatures of barrel sections 10 and 11 did increase via heat transfer from the molten resin. The total throughput was 10 lb/hr (4.54 kg/hr), and the extruder operated at 300 RPM. The residence time of the resin through the extruder was around 1-4 minutes. The mixture was continuously extruded though a die plate, quenched in an underwater pelletizer, and cut into pellets. The pellet water temperature was maintained below 23° C. to ease pelletizing and to prevent pellet agglomerates. During the extrusion, a portion of the unreacted silane (approx. 225 g) was removed from the extruder through a vacuum vent, set at −25 inches Hg (−635 mm Hg), located at barrel section 9, which was located towards the end of the extruder.

The weight percentage of silane within the extrudate was determined from the mass flow of the resin, and the volumetric flow rate of the silane/peroxide masterbatch, which was converted to mass flow rate based on a calibration. A sample of the finished pellets, after extrusion, was formed into a film, and then examined by the FTIR method to determine the initial amount of silane present in the resin. Next, the film was conditioned in a vacuum oven, at an elevated temperature of 50° C., for at least one hour, to evaporate residual unbound silane. The FTIR measurement was repeated on the conditioned film sample to obtain the final silane grafted level in the polymer. The percentage of the grafted silane was determined by FTIR.

For this FTIR procedure, the absolute level of silane grafting is measured on a corresponding reference material standard by neutron activation. The same reference material is then measured by FTIR, and the peak at the silane grafted frequency is correlated to the absolute value obtained by the neutron activation method. A calibration curve is generated for the FTIR absorbance versus actual graft level for the specific type of polymer standard. Grafted samples are then examined by FTIR, and the grafted silane values are calculated based on a correlation equation established for the standard.

Table 1 provides a summary of the weight percentages of the following: silane added into the extruder, silane remaining within the extrudate and silane grafted onto the resin. The weight of the silane and peroxide are each based on the total weight of the reactive composition (base resin (or resin formulation) plus silane plus peroxide). Table 2 provides additional grafting results, and also provides grafting results for a higher melt index, random ethylene/1-octene copolymer (apparent melt index=200 g/10 min), and for a blend containing 70 weight percent of this copolymer and 30 weight percent of the EO2 copolymer, as described above. As seen from Table 2, for an amount of silane at 10.5 weight percent, 1000 ppm peroxide provided higher grafting efficiencies.

Two grafted polymers, samples 4 and 10 (Table 1), were further characterized in terms of physical and mechanical properties, and formulated for adhesive testing.

Curing and Mechanical Testing of Silane Grafted Polyolefins

Formation of Resin/Activator Blend and Subsequent Cure in Water

Two silane grafted, high flow EO copolymers (samples 4 and 10) were cured in the presence of water, with di-butyl tin dilaureate, as an activator. The silane grafted resin was stored in a sealed foil bag. The silane grafted resin and the di-butyl tin dilaureate (ALDRICH 95%) were blended in a Rheomix 3000 (310 ml/200 gram) bowl at 85° C. Prior to the addition of the resin, the Rheomix bowl was preheated to 85° C., and the rotors were started at 70 rpm. The resin (200 grams) was immediately added to the bowl. The resin was melted and stirred by the rotation of the rotors for 8 minutes, after which time, the rotors were stopped, the ram was lifted, and di-butyl tin dilaurate (0.17 ml) was added. The ram was lowered, and the rotors were started at 70 rpm. The blend was allowed to mix for an additional 5 minutes. The polymer was then removed and pressed in Mylar film, in a room temperature press, to solidify the sample.

The solidified sample was then molded into two, 5"×5" plaques, 80 mil thick, using a laminating press. The plaques were then placed in a tray of water, which had been thermally equilibrated in an oven, heated to 90° C. The plaques were thermally treated (cured) in water, equilibrated at a temperature between about 84° C. to 87° C., for 17 hours. The plaques were dried, and micro tensile specimens were cut out of the plaques using a die.

Micro tensile specimens of the cured samples, as well as the base polymers, were prepared and tested. The die cut microtensile specimens were pulled at 5"/min on a Model 1125 Instron tensile frame, in accordance with ASTM D-1708. Specimens were held with air actuated grips (60 psi) and monitored using a 1000 lb calibrated load cell. The test was run at a 20 lb full scale range.

Physical properties of the base resins, grafted resins (samples 4 and 10) and respective cured resins are shown in Table 3.

TABLE 1

Summary of Grafting Results

| Sample # | Base Resin | Si grafted wt % | Si unbound after extrusion wt % | Si total, remaining in extrudate wt % | Si graft efficiency % | Silane added to extruder wt % | Peroxide added to extruder ppm |
|---|---|---|---|---|---|---|---|
| 1 | EO2 | 0.94 | 0.28 | 1.22 | 18.8 | 5 | 300 |
| 2 | EO2 | 2.26 | 0.33 | 2.59 | 45.2 | 5 | 900 |
| 3 | EO2 | 2.35 | 0.52 | 2.87 | 23.5 | 10 | 300 |
| 4 | EO2 | 4.29 | 0.81 | 5.10 | 42.9 | 10 | 900 |
| 5 | EO2 | 2.26 | 0.38 | 2.64 | 30.2 | 7.5 | 600 |
| 6 | EO1 | 0.94 | 0.27 | 1.21 | 18.7 | 5 | 300 |
| 7 | EO1 | 1.95 | 0.65 | 2.60 | 39.1 | 5 | 900 |
| 8 | EO1 | 1.78 | 1.10 | 2.88 | 17.8 | 10 | 300 |
| 9 | EO1 | 2.22 | 0.40 | 2.61 | 22.2 | 10 | 900 |
| 10 | EO1 | 2.24 | 0.57 | 2.81 | 29.9 | 7.5 | 600 |

TABLE 2

Additional Grafting Results

| Sample # | Base Resin | Si grafted, wt % | Si graft efficiency, wt % | Silane added to extruder, wt % | Peroxide, added to extruder ppm |
|---|---|---|---|---|---|
| 24 | EO2 | 3.22 | 30.7 | 10.5 | 990 |
| 25 | EO2 | 3.19 | 30.4 | 10.5 | 1,050 |
| 26 | EO2 | 4.79 | 45.6 | 10.5 | 1,050 |
| 27 | EO2 | 3.97 | 37.8 | 10.5 | 1,050 |
| 28 | EO (200 MI) | 4.92 | 46.8 | 10.5 | 1,000 |
| 29 | 30% EO2 and 70% EO (200 MI) | 5.82 | 55.4 | 10.5 | 1,000 |

TABLE 3

Physical Properties of the Base Resin, Grafted Resin and Cured Resin

| | EO1 | EO2 | Silane-g-EO1 (sample 10 - 2.24 wt % grafted Si) | Silane-g-EO2 (sample 4 - 4.29 wt % grafted Si) | Cured silane-g-EO1 | Cured silane-g-EO2 |
|---|---|---|---|---|---|---|
| Density (g/cc) | 0.8702 | 0.8738 | 0.8740 | 0.8803 | NM | NM |
| Viscosity @ 350° F. (177° C.) cP | 7,858 (7.858 × $10^{-3}$ Pa · s) | 15,747 (15.747 × $10^{-3}$ Pa · s) | 6,707 (6.707 × $10^{-3}$ Pa · s) | 14,367 (14.367 × $10^{-3}$ Pa · s) | Did not melt | Did not melt |
| $T_m$ (° C.) | 69.4 ($T_{m1}$) 52.6 ($T_{m2}$) | 71.4 ($T_{m1}$), 57.2 ($T_{m2}$) | 67.8 | 71.0 ($T_{m1}$) 56.2 ($T_{m2}$) | 67.8 | 70.6 |
| $T_c$ (° C.) | 54.3 ($T_{c1}$) 35.0 ($T_{c2}$) | 53.1 ($T_{c1}$), 32.3 ($T_{c2}$) | 50.6 ($T_{c1}$), 39.5 ($T_{c2}$) | 52.6 ($T_{c1}$), 32.7 ($T_{c2}$) | 51.4 ($T_{c1}$) 32.9 ($T_{c2}$) | 54.2 ($T_{c1}$) 38.0 ($T_{c2}$) |
| % Cryst. | 16 | 18 | 16 | 17 | 16 | 17 |
| Mw (g/mol) | 19,600 | 22,900 | 19,400 | 24,600 | 15,400* | 16,700* |
| Mn (g/mol) | 9,570 | 11,600 | 9,430 | 11,100 | 7,610* | 8,830* |
| Mw/Mn | 2.05 | 1.97 | 2.06 | 2.22 | 2.02* | 1.89* |
| % xylene extractables | NM | NM | NM | NM | 62.1 | 53.3 |

$T_m$ = Melting temperature
$T_c$ = Crystallization temperature
% Cryst. = Percent crystallinity
*GPC analysis on soluble fraction - GPC samples were filtered to remove insoluble gels.
NM = Not measured Mechanical properties of the base and cured resins are shown below in Table 4.

TABLE 4

Mechanical Properties of Base Resin and Cured Resin

| Sample | Average Break Strength (Psi) | Average Yield Strength (Psi) | Average Elongation to Break (%) | Average Young's Modulus (Psi) | Average Energy to Break (in-lb) |
|---|---|---|---|---|---|
| EO1 | 226 | 157 | 89 | 1274 | 1.8 |
| Cured Si-g-EO1 (2.24 wt % g-Si) | 316 | 266 | 211 | 1616 | 6.9 |
| EO2 | 313 | 303 | 214 | 1945 | 6.7 |
| Cured Si-g-EO2 (4.29 wt % g-Si) | 528 | 310 | 314 | 2193 | 15.1 |

Figure 2:
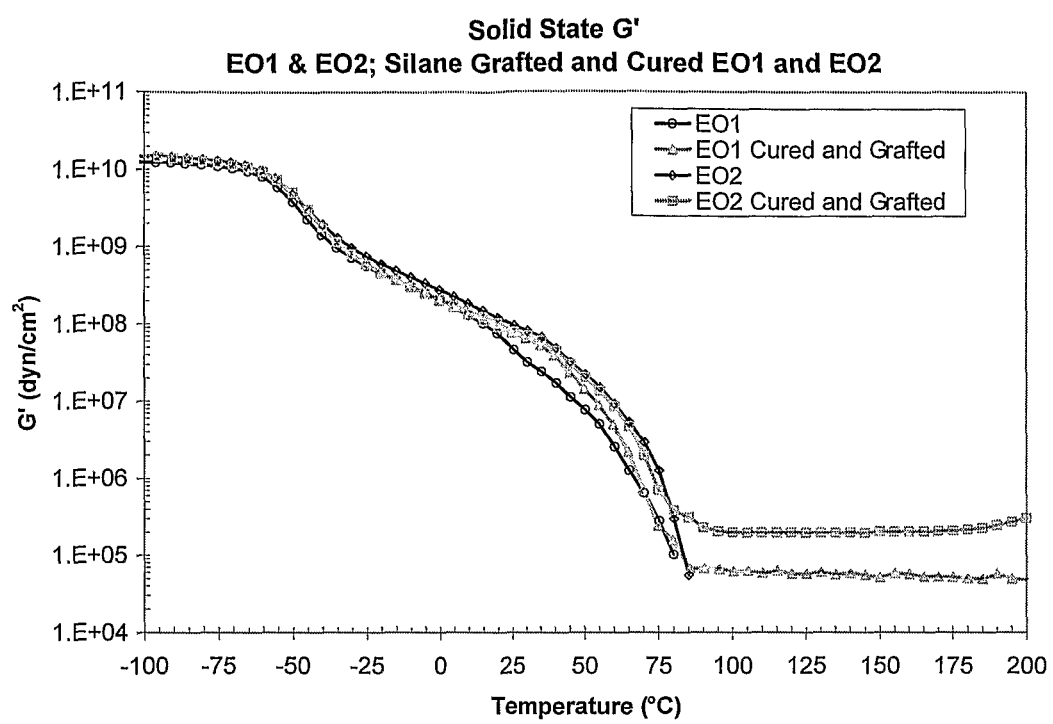
FIG. 2 depicts "storage modulus (G') versus temperature" profiles of cured silane-grafted resins and the respective base resins (EO1 and EO2).

Silane grafting resulted in a slight increase in density and small decrease in viscosity. In addition, there was very little change in crystallinity and melting temperatures. On the other hand, upon curing the grafted resin, the modulus and elongation at break, both significantly increased. Furthermore, the cured resin retained strong storage modulus at higher temperature (greater than about 80° C.). The mechanical properties (stress/strain and storage modulus G' from DMS) are depicted in FIGS. 1 and 2.

Figure 3:
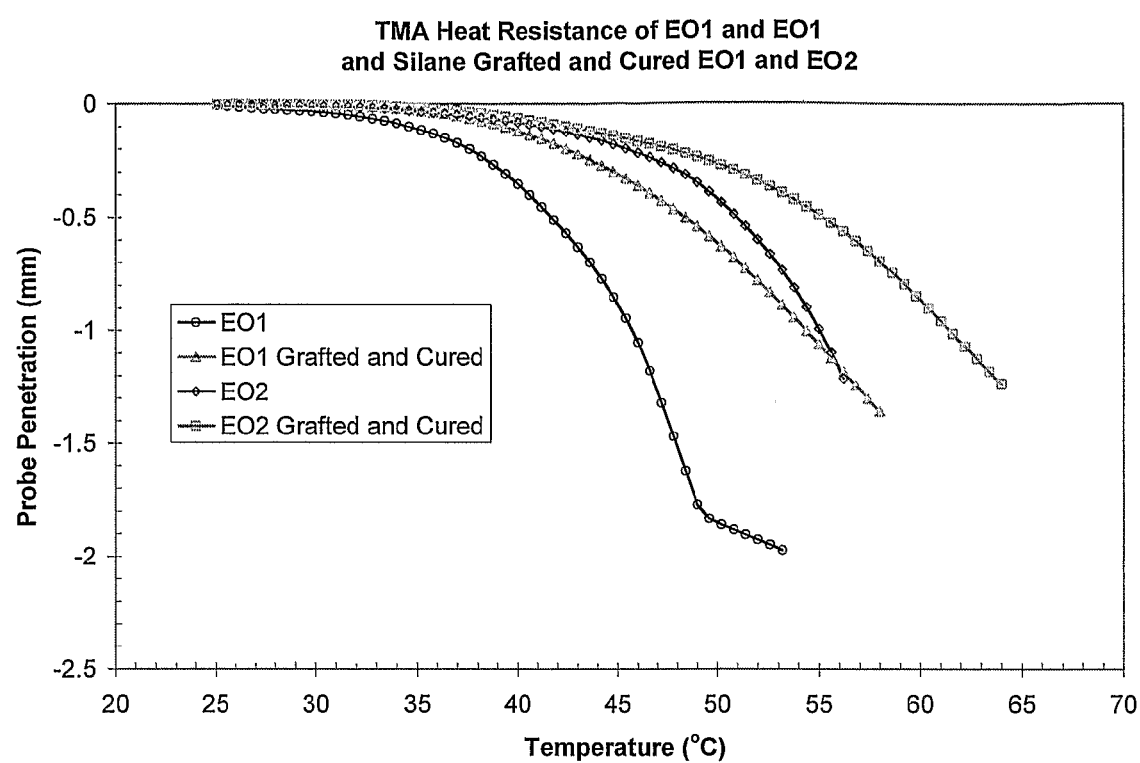
FIG. 3 depicts TMA (ThermoMechanical Analyzer) profiles of cured silane-grafted resins and the respective base resins (EO1 and EO2).

TMA results for the base resins and cured silane-grafted resins are shown in FIG. 3. The cured samples maintained structure for higher temperatures before significant probe penetration occurred.

Adhesive Testing-Case and Carton Sealing Applications

Adhesive formulations for case and carton sealing are shown below in Table 5. These formulations were tested using the following tests, SAFT, PAFT and fiber tear and Brookfield viscosity. All amounts are in weight percent, based on the total weight of the composition.

The "Si-g-EO2" is the silane grafted ethylene/1-octene copolymer containing 4.29 wt % silane graft (see sample 4). The "Si-g-EO1" is the silane grafted ethylene/1-octene copolymer containing 2.24 wt % silane graft (see sample 10). The weight percent graft is based on the total weight of the reactive composition (or the total weight of silane added to the reactive composition) as described above. An ungrafted EO2 copolymer served as a control. ESCOREZ 5637 is a tackifying resin from ExxonMobil Chemical Co., and DABCO T-12 is a tin based catalyst (for cure) made by Air Products.

TABLE 5

Adhesive Formulations

| Sample | A-1 | A-2 | A-3 | A-4 | A-5 | A-6 | B-1 | B-2 | B-3 |
|---|---|---|---|---|---|---|---|---|---|
| Si-g-EO2 (4.29 wt % Si) | 99.8 | 100 | | | | | 40 | 40 | |

TABLE 5-continued

Adhesive Formulations

| Sample | A-1 | A-2 | A-3 | A-4 | A-5 | A-6 | B-1 | B-2 | B-3 |
|---|---|---|---|---|---|---|---|---|---|
| Si-g-EO1 (2.24 wt % Si) | | 99.8 | | 100 | 50 | 50 | | | |
| DABCO T-12 | 0.2 | 0.2 | | | | 0.2 | 0.2 | 0.5 | |
| ESCOREZ 5637 | | | | | 50 | 49.8 | 35 | 35 | 35 |
| PX-100 Wax | | | | | | | 25 | 25 | 25 |
| EO2 (control) | | | | | | | | | 40 |

The adhesion properties, SAFT, PAFT and percent fiber tear, are shown below in Table 6. In addition, the thermal stability of each adhesive formulation was determined by measuring the melt viscosity (Brookfield viscosity) of the formulation, at 350° F. (177° C.), over time. The viscosity results are also shown in Tables 6A and 6B.

TABLE 6A

Adhesion Results

| Sample | A-1 | A-2 | A-3 | A-4 | A-5 | A-6 | B-1 | B-2 | B-3 Comp. |
|---|---|---|---|---|---|---|---|---|---|
| Initial Viscosity @350° F., cP | 20,000 | 7,410 | 14,000 | 6,480 | 2,270 | 2,490 | 1,180 | 1,180 | 1,180 |
| 4 Hr Viscosity @350° F., cP | | | | | | | 1,260 | 1,340 | 1,160 |
| 8 Hr Viscosity @350° F., cP | Gelled | 7,750 | 13,700 | 6,500 | 2,270 | 2,590 | 1,290 | 1,410 | 1,160 |
| Initial PAFT, ° F. | | | | | 128 | 128 | | | |
| Initial SAFT, ° F. | 173 | 160 | 167 | 156 | 138 | 139 | | | |
| 8 Hr PAFT, ° F. | | | | | 129 | 127 | | | |
| 8 Hr SAFT, ° F. | 176 | 160 | 167 | 156 | 139 | 140 | | | |
| 24 Hr PAFT, ° F. | | | | | 120 | 124 | 140 | 143 | 146 |
| 24 Hr SAFT, ° F. | 189 | 160 | 166 | 154 | 137 | 139 | 194 | 199 | 197 |
| 48 Hr PAFT, ° F. | | | | | 129 | 127 | 142 | 140 | |
| 48 Hr SAFT, ° F. | 256 | 165 | 166 | 155 | 138 | 143 | 198 | 220 | |

NOTE
DNF: Did not fail

TABLE 6B

Adhesion Results Continued

| Sample | A-1 | A-2 | A-3 | A-4 | A-5 | A-6 | B-1 | B-2 | B-3 Comp. |
|---|---|---|---|---|---|---|---|---|---|
| 72 Hr PAFT, ° F. | | | | | 123 | 131 | 143 | 146 | |
| 72 Hr SAFT, ° F. | 244 | 168 | 167 | 157 | 140 | 144 | 217 | 239 | |
| 96 Hr PAFT, ° F. | | | | | | | 147 | 147 | |
| 96 Hr SAFT, ° F. | | | | | | | 226 | 228 | |
| 144 Hr PAFT, ° F. | | | | | 124 | 140 | | | |
| 144 Hr SAFT, ° F. | DNF | 192 | 168 | 158 | 138 | 148 | | | |
| 192 Hr PAFT, ° F. | | | | | | | 149 | 148 | |
| 192 Hr SAFT, ° F. | | | | | | | 246 | DNF | |
| 336 Hr PAFT, ° F. | | | | | 124 | 148 | | | |
| 336 Hr SAFT, ° F. | DNF | DNF | 167 | 158 | 140 | 167 | | | |
| 500 Hr PAFT, ° F. | | | | | 124 | 148 | | | |
| 500 Hr SAFT, ° F. | DNF | DNF | 167 | 158 | 139 | 177 | | | |

| Inland Bonds 24 hr Cure | | PERCENT FIBER TEAR | |
|---|---|---|---|
| 0° F. | 50 | 75 | 50 |
| 35° F. | 100 | 100 | 100 |
| 120° F. | 100 | 100 | 100 |
| 140° F. | 100 | 100 | 100 |
| 72 Hr Cure @ 160° F. | 0 | 0 | 0 |

NOTE
DNF: Did not fail

Summary of Results:

All samples, with the exception of the A-1 formulation, had fairly good thermal stability (at 350° F.) as indicated by the Brookfield viscosity (350° F.) at 8 hr. The A-1 formulation was made twice and gelled both times.

The uncatalyzed samples did not cure, even after 500 hours at 54 percent RH. The SAFT's of all the catalyzed cured samples increased. In many cases a significant increase was observed. Bonds on the Inland corrugated board stock showed similar tear results for compounded silanated EOs and the unsilanated control. Increasing the catalyst from 0.2 percent to 0.5 percent increased the rate of cure slightly, but at the expense of thermal stability.

Adhesive Testing—Hot Melt/Pressure Sensitive Adhesive Formulations

Adhesive formulations are shown below in Table 7.

TABLE 7

Test Formulations for Hot Melt/Pressure Sensitive Adhesives (wt %)

| | C1 | C2 |
|---|---|---|
| Si-g-EO2 | 40.0 | 40.0 |
| CALSOL 5550 (Oil) | 20.0 | 25.0 |
| ESCOREZ 5400 (Tackifying Resin from ExxonMobil) | 39.8 | — |
| ESCOREZ 5637 (Tackifying Resin from ExxonMobil) | — | 34.8 |
| DABCO T-12 (Tin Catalyst) | 0.2 | 0.2 |

The Si-g-EO2 is the silane grafted ethylene/1-octene copolymer containing 4.29 wt % silane graft, as described above. ESCOREZ 5637 is a tackifying resin from ExxonMobil Chemical Co., and DABCO T-12 is a tin based catalyst (for cure) made by Air Products. CALSOL 5550 is a napthenic oil made by Calumet Lubricants.

The adhesive formulations were examined using a Pressure Sensitive Tape (PSTC-1) test and a SAFT test. PSTC-1 corresponds to ASTM D3330/D3330M-02 Standard Test Method for Peel Adhesion of Pressure Sensitive Tape.

Figure 4:
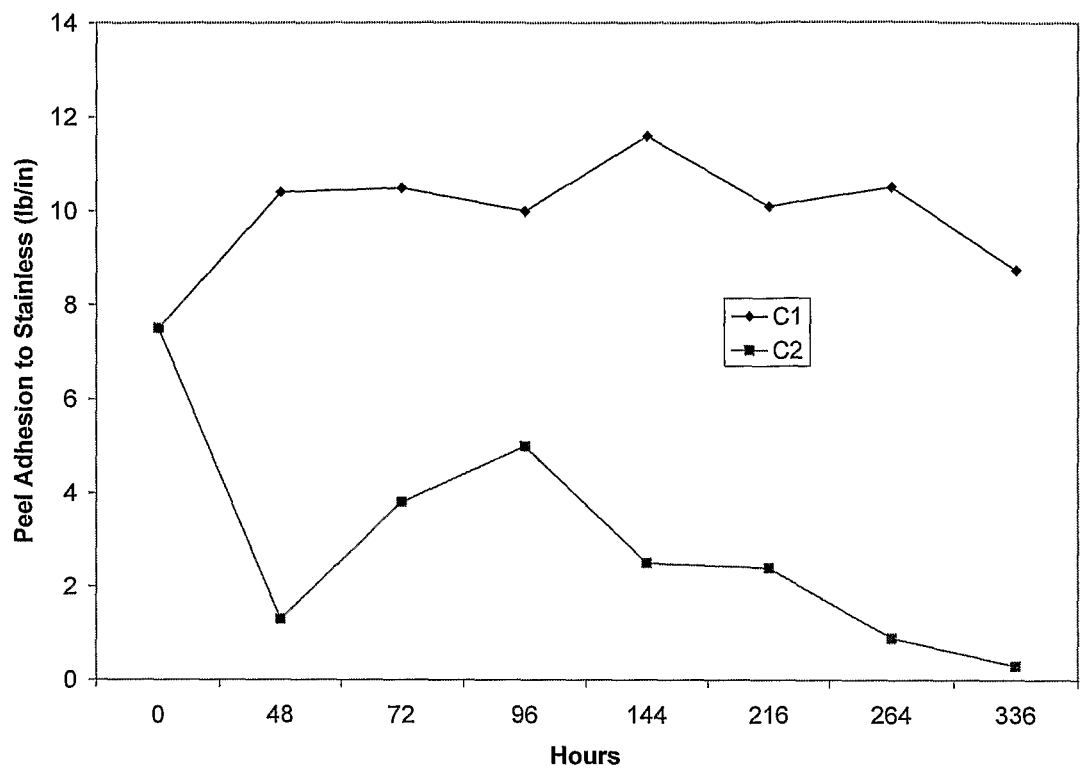
FIG. 4 depicts "peel adhesion to stainless steel versus time" profiles for two cured silanated resins.

The average peel values of three individual peels was recorded. Peel Adhesion to stainless steel was measured at several time intervals, from 0 to 336 hours, as shown in FIG. 4, and the results are listed in Table 8 below.

TABLE 8

Peel Adhesion to Steel

| Time (hr) | C1 (lb/in) | C2 (lb/in) |
|---|---|---|
| 0 | 3.75 | 3.75 |
| 48 | 5.2 | 0.65 |
| 72 | 5.25 | 1.9 |
| 96 | 5 | 2.5 |
| 144 | 5.8 | 1.25 |
| 216 | 5.05 | 1.2 |
| 264 | 5.25 | 0.45 |
| 336 | 4.375 | 0.15 |

SAFT Test Procedure

Figure 5:
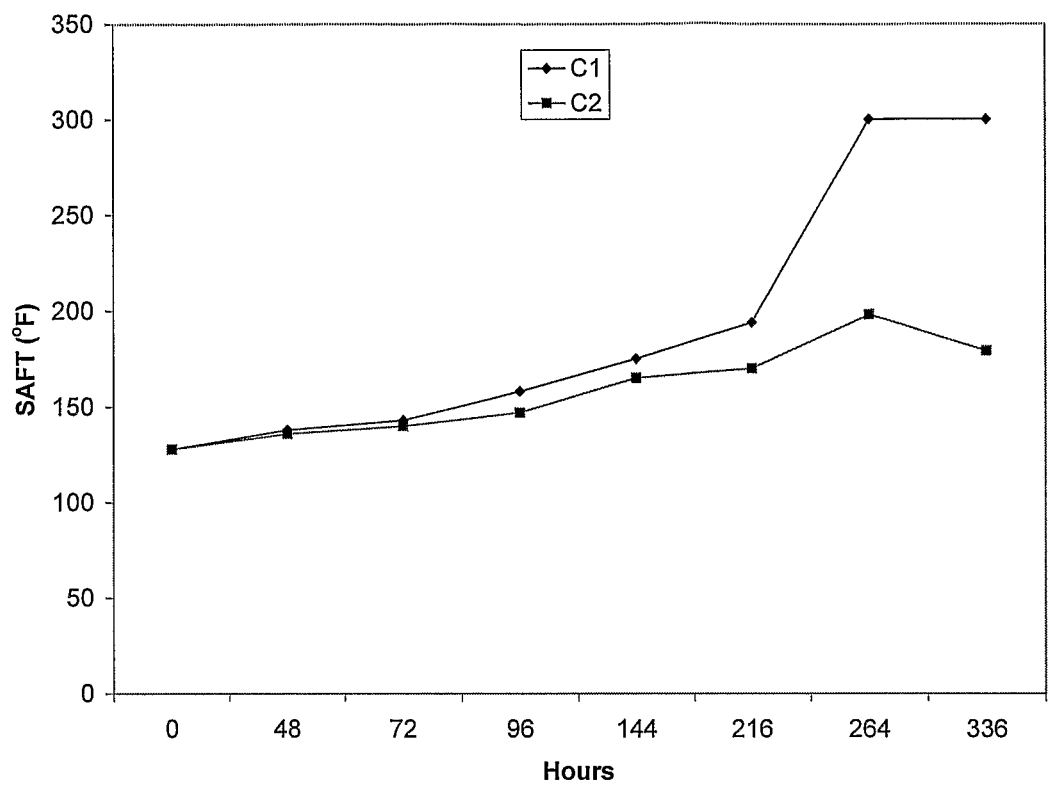
FIG. 5 depicts "SAFT (Shear Adhesion Failure Temperature) versus time" profiles of two cured silanated resins.

SAFT values are shown in FIG. 5, and summarized in Table 9 below.

TABLE 9

SAFT Results

| Time (hr) | C1 SAFT (° F.) | C2 SAFT (° F.) |
|---|---|---|
| 0 | 128 | 128 |
| 48 | 138 | 136 |
| 72 | 143 | 140 |
| 96 | 158 | 147 |
| 144 | 175 | 165 |
| 216 | 194 | 170 |
| 264 | 300 | 198 |
| 336 | 300 | 179 |

Summary of Adhesive Testing:

The failure mode for PSTC-1 peel testing for the C1 formulation was cohesive in nature throughout the entire test period.

The failure mode for PSTC-1 peel testing for the C2 formulation was cohesive initially, and became zippery and adhesive in nature to the stainless panel at 48 hours of cure.

The viscosities of these materials were not measured, but based on the B-1 formulation, the C2 formulation should have about the same viscosity (1,180 cP @ 350° F.) and the C1 formulation should be slightly lower in viscosity.

It appears that using a higher melting point, higher molecular weight tackifier (ESCOREZ 5637) resulted in a product that cured at a slower rate, or did not cure to the same extent, and did not maintain its pressure sensitive properties after cure.

Although the viscosity of the C1 formulation was estimated at about 1,000 cP, at 350° F., it had remarkably high peel adhesion to stainless steel and remarkably high ($\geq 300°$ F.) SAFT's.

The C1 formulation had a relatively low level of surface tack, and remarkably yielded a high peel force.

The unique compatibility of EO (ethylene/octene) polymers would allow for product modifications, for example with styrene ethylene butylene styrene (SEBS).

End Group Analysis

The end group analysis as determined by $^1$H NMR for the EO2 copolymer is shown in Table 10.

EO2, as discussed above, is a random ethylene/octene copolymer with a density of 0.874 g/cc, a melt viscosity of 17,000 cP at 350° F. (177° C.), a melt index (12) of 500 g/10 min at 190° C./2.16 kg, and a percent crystallinity around 18.

TABLE 10

1H NMR Results of the EO2 Copolymer.

| vinyl/1000C | (cis/trans)vinylene/1000 C | vinylidene/1000 C | $R_v$ |
|---|---|---|---|
| 0.018 | 0.087 | 0.079 | 0.096 |

Addition Silane Grafting Results

Additional grafting results are shown, using an EO2 base resin, in Table 11 below. Each grafting reaction took place in an extruder, with a screw speed from 300-425 rpm, and an average temperature (zones 3-8) from 200-240° C. The feed rate was 5-10 lb/hr. The grafted polymers were treated under vacuum to remove free silane (VTMS), and the amount of grafted silane is listed in Table 11.

TABLE 11

Grafting Results

| Sample # | Si grafted onto EO, wt % | Silane added to extruder (wt %) | Peroxide (POX) added to extruder (ppm) |
|---|---|---|---|
| 31 | 1.38 | 4 | 950 |
| 32 | 0.78 | 4 | 400 |
| 33 | 1.65 | 4 | 1500 |
| 34 | 1.2 | 6 | 600 |
| 35 | 1.53 | 6 | 950 |
| 36 | 1.93 | 6 | 1500 |
| 37 | 1.54 | 6 | 950 |
| 38 | 0.63 | 4 | 400 |
| 39 | 0.67 | 4 | 400 |
| 40 | 1.1 | 4 | 950 |
| 41 | 0.63 | 4 | 400 |
| 42 | 1.25 | 6 | 950 |
| 43 | 1.51 | 6 | 1500 |
| 44 | 1.33 | 4 | 950 |
| 45 | 0.79 | 4 | 400 |
| 46 | 0.62 | 4 | 400 |
| 47 | 0.93 | 4 | 400 |
| 48 | 1.89 | 4 | 2000 |
| 49 | 1.33 | 3 | 1500 |
| 50 | 1.23 | 3 | 950 |
| 51 | 1.33 | 4 | 950 |
| 52 | 1.33 | 4.5 | 1200 |

Samples 31-52 had the following properties: a) a melt viscosity at 177° C. ranging from 14,500 to 16,000 cP; b) a melt viscosity at 190° C. ranging from 10,900 to 12,300 cP; c) a density from 0.887 to 0.881 g/cc; d) a number average molecular weight from 10,500 to 11,600 g/mole; e) a weight average molecular weight from 23,800 to 25,100; f) a molecular weight distribution (Mw/Mn) from 2.1 to 2.4; g) a peak melting point (DSC) from 71° C. to 73° C.; h) a crystallization temperature (DSC) from 52° C. to 55° C. (main peak) and 30° C. to 35° C. (second peak); and a percent crsytallinity (DSC) from 18 to 20 percent.

We claim:

1. An adhesive composition consisting of the following:
   A) from 20 to 65 percent by weight, based on the total weight of the adhesive composition, of at least one silane-grafted ethylene/α-olefin polymer, and wherein the silane-grafted ethylene/α-olefin polymer has a melt viscosity from 2,000 cP to less than 50,000 cP, at 350° F. (177° C.), a density from 0.855 g/cm³ to 0.895 g/cm³, and a molecular weight distribution from greater than 1 and less than, or equal to, 3.5 and
   wherein the at least one silane-grafted ethylene/α-olefin polymer is formed from an ethylene/α-olefin polymer, having a percent crystallinity from 2 percent to less than 25 percent, and at least one melting temperature from 50° C. to 80° C., and a molecular weight distribution ($M_w/M_n$) from 1 to 3.5, and
   wherein the ethylene/α-olefin polymer has long chain branching;
   B) from 10 to 60 percent by weight, based on the total weight of the adhesive composition, of at least one tackifying resin;
   C) from 0 to 40 percent by weight, based on the total weight of the adhesive composition, of at least one wax;
   D) from 0 to less than 50 weight percent by weight, based on the total weight of the adhesive composition, of one or more oils;
   E) optionally one or more crosslinking catalysts; and
   F) one or more stabilizers; and
   wherein the composition comprises at least one wax and/or at least one oil.

2. The composition of claim 1, wherein the at least one silane-grafted ethylene/α-olefin polymer is formed from at least one silane represented by formula (I):

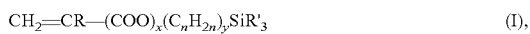

$$CH_2=CR-(COO)_x(C_nH_{2n})_ySiR'_3 \quad (I),$$

wherein, R is a hydrogen atom or methyl group; x and y are 0 or 1, with the proviso that when x is 1, y is 1; n is an integer from 1 to 12, and each R' is independently an alkoxy group having from 1 to 12 carbon atoms, aryloxy group, araloxy group, aliphatic acyloxy group having from 1 to 12 carbon atoms, amino or substituted amino groups, or a lower alkyl group having 1 to 6 carbon atoms, and with the proviso that not more than two of the three R' groups is an alkyl.

3. The composition of claim 2, wherein the at least one silane is selected from the group consisting of vinyltrimethoxysilane, vinyltriethoxysilane, and 3-(trimethoxysilyl)propyl methacrylate.

4. The composition of claim 1, wherein the at least one silane-grafted ethylene/α-olefin polymer is formed from an ethylene/α-olefin polymer containing a ratio of terminal vinyl groups to the sum of all unsaturation from 0.001 to 0.5, as determined by ¹H NMR.

5. The composition of claim 1, wherein the at least one silane-grafted ethylene/α-olefin polymer is formed from an ethylene/α-olefin polymer containing a ratio of terminal vinyl groups to the sum of all unsaturation from 0.01 to 0.4, as determined by ¹H NMR.

6. The composition of claim 1, wherein the at least one silane-grafted ethylene/α-olefin polymer is formed from an ethylene/α-olefin polymer containing a ratio of terminal vinyl groups to the sum of all unsaturation from 0.1 to 0.3, as determined by ¹H NMR.

7. The composition of claim 1, wherein the at least one silane-grafted ethylene/α-olefin polymer is formed from an ethylene/α-olefin polymer, having a number average molecular weight ($M_n$) less than 25,000.

8. The composition of claim 1, wherein the at least one silane-grafted ethylene/α-olefin polymer is formed from a copolymer of ethylene and at least one comonomer selected from the group consisting of ethylenically unsaturated monomers, conjugated dienes, nonconjugated dienes, and polyenes.

9. The composition of claim 8, wherein the comonomer is an ethylenically unsaturated monomer, selected from the group consisting of the $C_3$-$C_{20}$ α-olefins, styrene, alkyl-substituted styrene, vinylbenzocyclobutane, and 1,4-hexadiene.

10. The composition of claim 9, wherein the $C_3$-$C_{20}$ α-olefin is selected from the group consisting of propylene, isobutylene, 1-butene, 1-hexene, 1-heptene, 4-methyl-1-pentene, and 1-octene.

11. The composition of claim 10, wherein the $C_3$-$C_{20}$ α-olefin is selected from the group consisting of propylene and 1-octene.

12. The composition of claim 1, wherein the at least one silane-grafted ethylene/α-olefin polymer is prepared by reacting an ethylene/α-olefin polymer with at least one silane compound and at least one initiator, and wherein, the weight ratio of the at least one silane compound to the at least one initiator is from 30:1 to 400:1.

13. The composition of claim 12, wherein the reaction takes place in an extruder.

14. The composition of claim 12, wherein the ethylene/α-olefin polymer is reacted with one silane compound and one initiator, and wherein the ethylene/α-olefin polymer has a molecular weight distribution from 1 to 3.

15. The composition of claim 14, wherein the ethylene/α-olefin polymer has a density from 0.865 g/cm³ to 0.895 g/cm³.

16. The composition of claim 14, wherein the silane compound, that is reacted with the ethylene/α-olefin, is present in an amount of at least 5 weight percent, based on the total weight of the reactive composition, and the initiator is present in an amount from 300 ppm to 1500 ppm, based on the total weight of the reactive composition.

17. The composition of claim 12, wherein the amount of the at least one silane that is grafted onto the ethylene/α-olefin polymer is greater than 0.5 weight percent, based on the total weight of the reactive composition.

18. The composition of claim 12, wherein the amount of the at least one silane that is grafted onto the ethylene/α-olefin polymer is greater than 2 weight percent, based on the total weight of the reactive composition.

19. The composition of claim 17, wherein the composition comprises one or more antioxidants.

20. The composition of claim 17, further comprising at least one wax.

21. The composition of claim 17, further comprising at least one oil.

22. The composition of claim 19, wherein the composition has the following:
   a) a Peel Adhesion Failure Temperature (PAFT) of greater than, or equal to, 110° F. (43° C.), and/or
   b) a Shear Adhesion Failure Temperature (SAFT) of greater than, or equal to, 140° F. (60° C.).

23. The composition of claim 1, wherein the at least one silane-grafted ethylene/α-olefin polymer has a molecular weight distribution (Mw/Mn) from 2 to 3.

24. The composition of claim 1, wherein the at least one silane-grafted ethylene/α-olefin polymer has a number average molecular weight from 5,000 to 25,000.

25. The composition of claim 1, wherein the at least one silane-grafted ethylene/α-olefin polymer has a weight average molecular weight from 10,000 to 50,000.

26. An article comprising the composition of claim 19.

* * * * *